(12) United States Patent
Oswald et al.

(10) Patent No.: US 7,068,211 B2
(45) Date of Patent: Jun. 27, 2006

(54) METHODS AND APPARATUS FOR OBTAINING POSITIONAL INFORMATION

(75) Inventors: Gordon Kenneth Andrew Oswald, Cambridge (GB); Alan Trevor Richardson, Cambridge (GB); Michael Hugh Burchett, Cambridge (GB); Eric Nicol Clouston, Cambridge (GB); Danielle Emma Toutoungi, Warwickshire (GB)

(73) Assignee: Cambridge Consultants Limited, Cambridge (GB)

( * ) Notice: Subject to any disclaimer, the term of this patent is extended or adjusted under 35 U.S.C. 154(b) by 0 days.

(21) Appl. No.: 10/203,547

(22) PCT Filed: Feb. 8, 2001

(86) PCT No.: PCT/GB01/00500

§ 371 (c)(1),
(2), (4) Date: Jan. 24, 2003

(87) PCT Pub. No.: WO01/59473

PCT Pub. Date: Aug. 16, 2001

(65) Prior Publication Data

US 2003/0151541 A1    Aug. 14, 2003

Related U.S. Application Data

(60) Provisional application No. 60/209,587, filed on Jun. 6, 2000.

(30) Foreign Application Priority Data

Feb. 8, 2000    (GB) ................. 0002857.1

(51) Int. Cl.
*G01S 13/92* (2006.01)

(52) U.S. Cl. ............... 342/70; 342/71; 342/72; 342/27; 342/28

(58) Field of Classification Search .......... 342/22, 342/27, 28, 70–72
See application file for complete search history.

(56) References Cited

U.S. PATENT DOCUMENTS

| | | | |
|---|---|---|---|
| 3,660,846 A | 5/1972 | Anderson | |
| 3,735,398 A | 5/1973 | Ross | |
| 3,768,097 A | 10/1973 | Ziegler | |
| 3,898,653 A | 8/1975 | Ban et al. | |

(Continued)

FOREIGN PATENT DOCUMENTS

CH    652 832    11/1985

(Continued)

OTHER PUBLICATIONS

Hane et al.; WO 86/00716; PCT/SE85/00263; "A Method for Position-Finding and Apparatus-Herefor"; Jan. 30, 1986.*

(Continued)

*Primary Examiner*—Thomas H. Tarcza
*Assistant Examiner*—Isam Alsomiri
(74) *Attorney, Agent, or Firm*—Nixon & Vanderhye, PC

(57) ABSTRACT

An apparatus and method obtains positional information about one or more objects in a detection field. An array includes a transmitting element and a plurality of receiving elements. A truncated cross-correlation function may be applied to determine the interval between signals received by a plurality of the receiving elements, thereby to determine an angular position of an object. A warning zone may be defined and it is determined whether an object is within the warning zone. Also disclosed are techniques for stretching received signals, and techniques for obtaining positional information relating to an object using non-Doppler radar.

62 Claims, 7 Drawing Sheets

U.S. PATENT DOCUMENTS

| | | |
|---|---|---|
| 3,996,590 A | 12/1976 | Hammack |
| 4,057,708 A | 11/1977 | Greeley et al. |
| 4,165,511 A | 8/1979 | Wocher et al. |
| 4,244,026 A | 1/1981 | Dickey |
| 4,349,823 A * | 9/1982 | Tagami et al. ............... 342/70 |
| 4,595,924 A | 6/1986 | Gehman |
| 4,739,329 A | 4/1988 | Ward et al. |
| 4,864,298 A | 9/1989 | Dombrowski |
| 4,952,939 A | 8/1990 | Seed |
| 5,008,678 A * | 4/1991 | Herman ..................... 342/158 |
| 5,172,118 A | 12/1992 | Peregrim et al. |
| 5,181,039 A | 1/1993 | Oswald et al. |
| 5,184,135 A | 2/1993 | Paradise |
| 5,386,737 A | 2/1995 | Soeder et al. |
| 5,392,050 A | 2/1995 | Guerci et al. |
| 5,510,800 A | 4/1996 | McEwan |
| 5,529,138 A * | 6/1996 | Shaw et al. ................. 180/169 |
| 5,734,346 A | 3/1998 | Richardson et al. |
| 5,805,110 A | 9/1998 | McEwan |
| 5,829,782 A | 11/1998 | Breed et al. |
| 5,900,833 A | 5/1999 | Sunlin et al. |
| 6,218,983 B1 | 4/2001 | Kerry et al. |
| 6,326,915 B1 * | 12/2001 | Chen et al. ................... 342/71 |
| 6,396,435 B1 * | 5/2002 | Fleischhauer et al. ........ 342/70 |
| 6,493,380 B1 | 12/2002 | Wu et al. ..................... 375/224 |

FOREIGN PATENT DOCUMENTS

| | | |
|---|---|---|
| DE | 23 29 690 | 1/1975 |
| DE | 40 05 919 | 2/1990 |
| DE | 196 37 843 A | 3/1992 |
| EP | 0 023 625 | 2/1981 |
| EP | 0 188 757 | 7/1986 |
| EP | 0 293 533 A2 | 12/1988 |
| EP | 0 293 533 A3 | 12/1988 |
| EP | 0 473 082 A2 | 3/1992 |
| EP | 0 473 082 A3 | 3/1992 |
| EP | 0 477 094 | 3/1992 |
| EP | 0 511 914 | 11/1992 |
| EP | 0 641 448 | 3/1995 |
| EP | 0 831 553 | 3/1998 |
| EP | 0 853 768 | 7/1998 |
| EP | 1 070 968 | 1/2001 |
| FR | 2 594 555 | 8/1997 |
| GB | 2 038 132 | 7/1980 |
| GB | 2 075 301 | 11/1981 |
| GB | 2 252 217 | 7/1992 |
| GB | 2 307 811 | 6/1997 |
| GB | 2 308 034 | 6/1997 |
| GB | 2 309 555 | 7/1997 |
| GB | 2 315 179 | 1/1998 |
| GB | 2 318 009 | 4/1998 |
| GB | 2 319 420 | 5/1998 |
| GB | 2 324 864 | 11/1998 |
| GB | 2 328 819 | 3/1999 |
| GB | 2 328 820 | 3/1999 |
| GB | 2 336 261 | 10/1999 |
| WO | WO 89/06808 | 7/1989 |
| WO | WO 90/ 13048 | 11/1990 |
| WO | WO 93/24847 | 12/1993 |
| WO | WO 94/24579 | 10/1994 |
| WO | WO 94/24580 | 10/1994 |
| WO | WO 95/07473 | 3/1995 |
| WO | WO 96/07928 | 3/1996 |
| WO | WO 96/07932 | 3/1996 |
| WO | 97 14058 A | 4/1997 |
| WO | 98 00728 A | 1/1998 |
| WO | 98 00729 A | 1/1998 |
| WO | WO 98/15436 | 4/1998 |

OTHER PUBLICATIONS

J. Robinson; "An I.s.i.-based p.c.m. processor for high-quality sound transmission"; Journal of Inst. of Electronic & Radio Engineers; vol. 55, No. 7/8; pp. 247-252, Jul./Aug. 1985.

Cumhur C. Evci et al.; DPCM-AQF Using Second-Order Adaptive Predictors for Speech Signals; IEEE Transaction on Acoustics, Speech and Signal Processing; vol. ASSP-29, No. 3; Jun. 1991, pp. 337-341.

Kunihiko et al..; "A New Channel Bank with Block Companding"; IEEE Transactions on Communications, vol. COM-30, No. 4, Apr. 1982,: pp. 574-580.

"New Sensors on the radar"; Interface/Issue 32; p. 14.

Benlarbi-Delat et al; "Microwave Short-Range Interferometric Radar" 1998 International Conference on Modeling and Simulation of Microsystems, Semiconductors, Sensor and Actuators, Proceedings of Modelling and Simulation of Microsystems, Semiconductors, Sensors and Actuators, Santa Clara, CA, USA, Apr. 6-8, 1998, pp. 637-642, XP001006127.

* cited by examiner

METHODS AND APPARATUS FOR OBTAINING POSITIONAL INFORMATION

CROSS REFERENCE TO RELATED APPLICATIONS

This application is a 371 of PCT/GB01/00500, filed Feb. 8, 2001, designating the United States, which claims the benefit of U.S. Provisional Application No. 60/209,587, filed Jun. 6, 2000 and UK Application No. 0002857.1, filed Feb. 8, 2000.

BACKGROUND AND SUMMARY OF EXEMPLARY NON-LIMITING EMBODIMENTS

The present technology described herein relates to techniques for obtaining positional information about one or more objects. More specifically, the technology described herein relates to methods of and apparatus for determining distance and angular positional information of an object or a plurality of objects with respect to a datum.

Many possible applications of exemplary embodiments are envisaged. One specific field of application is within the automotive industry where an exemplary system might be deployed on a vehicle with a field of detection within or without the vehicle or both. In general, a reference to a vehicle in this specification may have particular application to a land vehicle, or, more particularly, a motor land vehicle such as a powered road vehicle. The vehicle would usually be wheeled or tracked and/or be incapable of flight.

For example, there exists a known problem with safety air bags that they can cause serious injuries if deployed while a person is sitting too close to the bag. Moreover, if the vehicle were not fully occupied, it would be desirable to deploy only those bags needed to protect the occupants. This would minimise the pressure pulse that is generated within the vehicle upon deployment and also reduce the considerable cost of replacement of the air bags if the vehicle is subsequently repaired. An exemplary embodiment of the present system might be employed to determine the number and position of the occupants in a vehicle and control the deployment of air bags accordingly; such a system could apply to any or all of the air bags, whether side or front air bags. This information could further be used to send an automatic notification to the emergency services in the event of an accident. Use of the system within a vehicle might be extended to act as an intruder detection system, to monitor the contents of a load bay or boot, or even to detect movements of the driver characteristic of an onset of drowsiness.

An exemplary embodiment of the present system could also be employed to determine the relationship between a vehicle and surrounding objects. For example, a system could provide a driver with a manoeuvring aid to avoid contact with objects or people during reversing or parking manoeuvres, and to measure a space to determine whether the vehicle can fit into it.

An indication might be provided to warn a driver of the presence of a vehicle in a mirror blind spot to assist the driver when changing lane or merging into traffic. Furthermore, a warning could be issued or the brakes applied to prevent the vehicle from hitting the one in front in slow-moving or congested traffic. Of course, such applications are not limited to use on passenger vehicles. They might equally be applied to commercial vehicles or earth-moving equipment. Such a system can provide an operator of a vehicle with a complete assessment of the situation existing in the vicinity of the vehicle.

An exemplary embodiment of the present system might also have aeronautical applications, such as collision warning for aircraft, or as a landing aid, particularly for helicopters.

Further applications of an exemplary embodiment of the present system might include position monitoring for articles in a handling system such as a production line or articles in a post handling system; intruder detection in a building or an open space as part of a security system; liquid level detection; imaging the interior of a room from outside its walls and gathering information through walls generally; detecting the presence of articles within structures such as walls; amongst many other possibilities.

As a further example, there is often a need to determine the location of objects, such as cables, pipes or reinforcement rods within walls. It is often essential to locate such objects with accuracy prior to carrying out operations on the wall, such as drilling or demolition. An exemplary embodiment of the present system can be used to provide an accurate indication of the location of such objects.

An exemplary embodiment of the present system may also provide data for further processing for classifying, tracking and measuring moving objects.

U.S. Pat. No. 5,829,782 discloses a system for monitoring occupancy of a vehicle. The disclosed system operates by emitting signals within the vehicle and, by means of suitable detectors, monitoring reflections of these waves. The reflected signals are analysed algorithmically using a variety of pattern-recognition techniques to look for the presence of characteristic qualitative and/or quantitative features. The results of the analysis are compared with results obtained under controlled conditions in order to draw an inference about the occupancy of the vehicle. Since the system operates by comparing a signal with previously obtained patterns, it does not enable accurate location of arbitrary objects within its detection field.

WO98/00729, the named "Applicant" of which is the present assignee, discloses a radar system, particularly for use on a vehicle, to provide a driver with a warning of potential obstructions in the vicinity of the vehicle. The system establishes a plurality of static, scanning and tracking range gates at which objects can be detected. The disclosure of WO98/00729 is hereby incorporated into this specification by reference.

WO97/14058, the named "Applicant" of which is the present assignee, discloses a system in which a signal is transmitted into a detection region, and signals reflected from an object in that region are detected at a plurality of locations. By monitoring these reflections as the object passes through a plurality of range gates, the trajectory of the object can be established. While this system is highly effective for its intended purpose, it has been found that it is not ideally suited to detection of objects that are stationary within the detection region. This can limit the effectiveness of such apparatus in applications of the type described above. The disclosure of WO97/14058 is hereby incorporated into this specification by reference.

Angular Resolution by Cross-Correlation

From a first aspect, an exemplary embodiment provides apparatus for obtaining positional information relating to an object, the apparatus comprising:

an (optionally fixed) array comprising a transmitting element and a plurality of receiving elements;

a signal generating stage for applying a series of pulses to the transmitting element to cause it to transmit a signal, such that at least a portion of the signal can be reflected from the object to be received by the receiving elements;

a detection stage for detecting signals reflected to the receiving elements and for generating output signals representative of the received signals; and a processing stage operable by application of a truncated cross-correlation function to detect, measure or determine the interval between signals received by a plurality of the receiving elements, whereby to determine an angular position of an object from which the transmitted signal has been reflected.

Application of a truncated cross-correlation function to signals received by the array may provide a correlation result that is less prone to error than is the case for conventional correlation functions. Moreover, the correlation can be achieved more quickly than is the case for conventional correlation functions. By carrying out the cross-correlation of the received signals in the time domain, the value of the interval is obtained directly.

Operation of a system according to this aspect can be contrasted with the operation of a phase comparison monopulse radar system. In such a system, a relationship between phase and frequency of received signals is first obtained. In many cases, this is done after mixing with a local oscillator. A delay is then calculated from the relationship between phase and frequency. However, it is recognised that such systems suffer from intrusion of phase noise that is inherent in many systems. Moreover, to preserve the unambiguous phase relationship, it is necessary for two receiving antennas to be placed closer together than the wavelength of the signal with the result that good angular resolution is possible with such systems only by providing several such spaced-apart antennas.

Conventional cross-correlation between two signals includes the step of summing the products of the two signals over a period (the interval of correlation) corresponding to the duration of the waveform contained in the signals. This step is carried out for a series of cases between which one of the signals is shifted in time with respect to the other over a range which, in conventional cross-correlation, is also comparable with the duration of the waveform.

In the first aspect, a truncated cross-correlation function is applied to the signals received by two or more of the receiving elements. By truncated cross-correlation it is preferably meant that the range over which one of the signals is shifted with respect to the other is less than that in conventional cross-correlation. Thus the truncated cross-correlation function is preferably operable to shift one output signal with respect to another over a range which is less than the duration of the signals and preferably less than the duration of a pulse.

The maximum time interval between receipt of the same signal at two receiving elements is equal to the time taken for the signal to propagate directly between them, which is equal to the distance between the elements divided by the speed of propagation of the transmitted signal. Therefore, it may be appropriate to limit the extent of cross-correlation to this time value, or to some related value. Thus the truncated cross-correlation function is preferably operable to shift one output signal with respect to another over a range in which the maximum offset in either direction is less than 5 times the time that would be taken for the transmitted signal to travel directly from one receiving element to another, and preferably less than or equal to 3, 2 or 1 times this value.

In this way, the amount by which a signal received by one of the receiving elements is shifted with respect to a signal received by another receiving element can be limited to a value corresponding, for example, to the maximum anticipated delay between the two. This may keep to a minimum the likelihood of false correlation peaks being generated and reduce the amount of processing required.

In certain circumstances it may be appropriate to limit the maximum offset to less than the time taken for the transmitted signal to travel directly from one receiving element to another. Such a situation may arise, for example, if the array has a field of view of less than 180°, in which case the maximum offsets may be reduced accordingly. The maximum positive offset and the maximum negative offset need not be equal, and indeed they may be different, for example if the field of view is not symmetrical.

In a typical embodiment, the signal has a characteristic wavelength $\lambda$ and the interval of correlation (that is the range of signals used in the cross-correlation) is a small multiple of $\lambda$. For example, the interval of correlation may be less than 10, 5, or 2 $\lambda$, or even 1$\lambda$. As a minimum, the cross-correlation function is applied over two samples, although in many embodiments a greater number of samples is used.

The interval of correlation may also (or alternatively) be related to the receiving elements. Specifically, where the receiving elements are spaced apart by a distance D (that is, the distance between adjacent receiving elements is D; however, the distance may also vary such that the D from a first receiving element to a second may be different than the D between either the first or second receiving element and any other receiving element), the truncated cross-correlation function may have an interval that is less than a small multiple of D. For example, the interval of correlation may be less than 5, 2, 1.5 or 1D, or, where the detection field of at least one element is less than 180 degrees, it may be 0.9D, 0.8D or 0.7D. This is a relevant consideration because the maximum difference in the length of the flight between the same signal received by two receiving elements is the spacing between those elements.

Typically the processing stage is operative to identify a maximum value of the cross correlation function. The maximum identifies the portions of greatest similarity between the two signals, and, from this, the interval between receipt of the two signals can be deduced.

Pulses preferably occupy a constant band of frequencies and are preferably relatively short.

The first aspect also provides apparatus for obtaining positional information relating to an object, optionally including any of the above mentioned features, the apparatus comprising:

transmitting means for transmitting a signal for at least partial reflection by the object;

a plurality of receiving means for receiving a signal reflected by the object; and processing means for applying a truncated cross-correlation function to signals received by a plurality of the receiving means, thereby to determine a position of the object.

In the first aspect there may also be provided, optionally in dependence of any apparatus described above, apparatus for obtaining positional information relating to an object in which the or a processing stage is operable to detect the interval between a signal being received by a first set of any two or more of the receiving elements and to determine a first angular position of an object from which the transmitted signal has been reflected; and to determine the interval between a signal being received by a second set (which may include one or more of the elements of the first set) of any two or more of the receiving elements and to determine a second angular position of an object from which the transmitted signal has been reflected; the processing stage being preferably operable by application of a truncated cross-correlation function.

In preferred embodiments, the first and second angular positions are measured in planes that are substantially non-parallel to one another. These angular positions can be used to provide two angular values of 3-dimensional polar co-ordinates of the object. Most favourable resolution of both angles can be achieved if the said planes are approximately normal to one another.

In an exemplary embodiment of the present apparatus, the processing stage may be operative to determine the distance from the array of an object from which a signal has been reflected. This can provide the third measurement required to obtain the co-ordinates of an object in three-dimensional space.

Thus, the three-dimensional position of an object may be determined with precision by measuring its angular position within what might be a relatively broad antenna beam, rather than using a larger antenna or a higher frequency to provide a precisely-tailored, narrow beam. This may permit the use of devices that have a smaller frequency/aperture ratio than has hitherto been possible.

The processing stage may be operable to determine a coordinate in three-dimensional space of an object from which the transmitted signal has been reflected, for example by using the angles determined as described in the last two preceding paragraphs.

In a favoured configuration, at least one of the first and second set of receiving elements includes three or more elements disposed such that that set includes at least two pairs of elements, the spacing of elements in the two pairs being unequal. This allows the same angular information to be obtained from two different pairs of receiving elements, to permit compensation for artefacts of the array, for example, grating lobes. For example, the spacing (D) between the elements of one pair may be approximately equal to (for example between 50% and 200% or between 75 and 150% of) a characteristic wavelength λ of the signal, the spacing between a second pair of elements may be approximately equal to 3λ/4, or 3 D/4, and the ratio of the spacing of the elements in one of the first and second pairs to the spacing of the elements in the other of the first and second pairs may be between 0.5 and 1 or 0.75 and 0.9. Preferably the relative spacing is arranged so that grating lobes which arise in the pairs line up differently, that is, a positive grating lobe for one pair substantially lines up with a negative or zero grating lobe for the other.

In embodiments according to the last-preceding paragraph, the processing stage may be operative to perform a truncated cross-correlation between the signals received by each pair of elements and to calculate the product of, or otherwise compare, the results of the cross-correlations. This can allow mutual calculation of errors or other artefacts in the received signals.

An apparatus in accordance with an exemplary embodiment may further comprise an output stage operative to generate an output for presentation of positional information relating to the object to a user. For example, the output may include at least one of an audible and a visual signal. The apparatus can thus be used to inform a user directly of the presence of an object in its field of detection.

Warning Zone

From a second aspect (which may optionally be provided in combination with the first aspect), an exemplary embodiment provides apparatus for obtaining positional information relating to an object, the apparatus comprising:

a warning zone definition stage for defining a warning zone (in two or three dimensions) within a detection field of the apparatus; and a discrimination stage for determining whether a detected object is within the warning zone;

in which the warning zone is preferably defined as a three-dimensional region within the detection field.

This aspect allows a warning zone to be defined that is largely independent of the shape of the beam generated by the transmitting element, that is, the antenna design can be decoupled from the zone definition. This can allow the system to operate at frequencies at which the beam formed by the antenna alone would be too wide, thereby allowing comparatively low frequency (and therefore low cost) apparatus to be used, and to use antennas which are smaller than would otherwise be applicable, and also less costly.

Preferably the apparatus further comprises an object location stage for determining the position of a detected object within the detection field of the apparatus. The discrimination stage may then be operable to compare the coordinates of the detected object to the coordinates of the warning zone to determine whether the object is within the warning zone. As will be seen, this arrangement acts to disconnect the function of generating a warning from detection of an object.

Typically, the warning zone may be contained within and may be smaller than the detection field of the apparatus. More specifically, the shape of the warning zone may be dissimilar from the shape of the detection field of the apparatus and/or may be non-circular or non-spherical. The shape of the warning zone may therefore be tailored to the needs of a particular application, largely independently of the shape of the detection field.

For example, the warning zone may include a region (such as a planar surface) defined in two dimensions within the detection field.

The warning zone definition stage may include an algorithm that defines a warning zone as a function of a coordinate within the detection field. Such a region may have an essentially arbitrary shape as defined by the algorithm. Alternatively or additionally, the warning zone definition stage may define at least a limiting value of one or more ordinates of a coordinate within the detection field. Each such limit effectively defines a cut-off of the warning zone in a particular direction. For example, the warning zone definition stage may define at least a limiting value of one or more angles of a polar coordinate within the detection field. Alternatively or additionally, the warning zone definition stage may define at least a limiting value of a range of a polar coordinate within the detection field. Such is the essentially arbitrary shape of a warning zone, that it may include a plurality of discontinuous spatial regions.

An exemplary apparatus according to an exemplary embodiment may further comprise an object location stage for determining the position of a detected object within the detection field of the apparatus. More specifically (or alternatively) the discrimination stage may include a coordinate generating stage that generates a coordinate of a detected object, which coordinate is then compared with the warning zone. In such embodiments, the discrimination stage is typically operable to determine the coordinates of the detected object and compare the determined coordinates with the coordinates of the warning zone to determine whether the object is within the warning zone.

In exemplary embodiments of this aspect, the discrimination stage may be operative to generate an output signal indicative that the object is within the warning zone. An apparatus embodying this aspect may be further operative to issue a warning, for example at least one of an audible, a visual or a tactile warning to a user upon detection of an object in the warning zone, thereby providing an immediate warning to a user.

As a development of this aspect, the warning zone definition stage defines a plurality of warning zones. The warning zones may be non-coextensive (overlapping, separated or spatially different) and/or alternatively defined, by which it is meant that different characteristics are used for determining whether an object is in the relevant warning zones. Thus the discrimination stage may be operable to apply different logic to at least two of the zones. For example, different zones may be provided for detecting different speeds or different sizes of objects. This can, for example, be used to provide warnings of multiple levels of severity, depending upon the position or other characteristics of a detected object.

An apparatus according to the last-preceding paragraph may be operative to generate an output signal indicative of which of the plurality of warning zones contains the object. For example, it may be further operative to issue at least one of an audible and a visual warning to a user upon detection of an object in a warning zone.

The warning zone may be limited in range and/or may be approximately cuboid.

In another development of this aspect of the apparatus, the discrimination stage is operative to analyse characteristics of objects outside of the warning zone. Such characteristics may be, for example, size of the object, distance of the object from the apparatus and/or the warning zone, direction of movement of the object relative to the apparatus and/or the warning zone, and relative speed of the object. As an example, the discrimination stage may be operative to track objects outside the warning zone and to predict their entry into the warning zone. The apparatus may be operative to issue a pre-warning based on the analysis.

For example, if the apparatus is mounted on a vehicle (as described below) in order to provide the driver with a parking aid, the apparatus may issue a pre-warning in the way described above if a large object is converging with the vehicle, even though that object may be outside of the warning zone. This may be particularly desirable, for example, if the object itself is heading for the vehicle in the same direction that the vehicle is heading for the object, which may give an increased risk of collision.

An apparatus embodying this or any other aspect may be suitable for use on a vehicle and may optionally include the vehicle. In such apparatus, at least one of the shape and a relevant dimension of a warning zone may at least in part be determined in dependence on a corresponding shape and dimension of the vehicle. For example, a warning zone may have a width that is equal to the width of the vehicle plus a predetermined amount (preferably which is less than the width of the vehicle) in order to assist an operator of the vehicle when navigating narrow openings. A warning zone may have a height that is equal to the height of the vehicle (including any accessories, such as a radio antenna) plus a predetermined amount (preferably which is less than the height of the vehicle), for example to allow for error and for suspension displacements. A warning zone may have a lower surface that is substantially planar and spaced above a road surface upon which the vehicle is supported. Spacing the lower surface above the road can exclude false alarms generated by low curbs, and small, insignificant objects on the road surface.

The shape and a relevant dimension of the warning zone of apparatus for use on a vehicle may be changed in response to vehicle operating conditions (by the warning zone definition stage).

Such vehicle operating conditions may include at least one of speed, direction of travel, vehicle controls (such as accelerator, brake and clutch position) and ambient environmental conditions (amongst other possibilities). For example, the warning zone may extend further forward from the vehicle at high speed, and/or the zone may be extended further to one side of the vehicle when cornering.

Frequency Considerations

Typical exemplary embodiments in any aspect are operative to transmit an electromagnetic signal, typically radio frequency, for example, microwave, radiation. Such radiation is readily controllable and well-suited for the purposes of the exemplary embodiments.

For example, the transmitted signal may have a frequency of between 0.5 or 1 and 77 GHz, of between 2 and 25 GHz, of approximately one of 0.5 GHz, 1 GHz, 6 GHz, 10 GHz or 2–2.5 GHz. Such signals have a useful ability to penetrate solid objects, including objects made of wood, plastic material, concrete, brick and other non-metal materials. This might, for example, allow the apparatus to be located on the opposite side of a wall from a region that is to be monitored or within a structure of a vehicle such as a bumper. Moreover, such signals may be used to detect solid metal objects embedded within non-metal objects. These frequency ranges may be implemented using apparatus that is of advantageously low cost, and may have an advantageous ability to penetrate solid material. In a typical embodiment, the frequency may be approximately 2.45 GHz, possibly in order to meet applicable legislative requirements.

In general, a particular frequency will be chosen on the basis of several criteria: cost (low frequency is better), size of the antenna (high frequency is better), receiver performance (low frequency is better), scattering performance (this depends upon geometry, but a wide relative bandwidth (high bandwidth and low frequency) reduces glint), and applicable legislative requirements.

The transmitted signal may have a relative bandwidth (say, to the centre frequency) of approximately 15%, say between 3 and 33%, 5 and 25% or 10 and 20%.

An apparatus operating with a frequency and/or bandwidth set forth in the preceding paragraphs may be operative to resolve an angular position of an object with respect to a predetermined datum.

Pulse Length in Relation to Target/Array

From a third aspect (which may optionally be provided in combination with either or both preceding aspects or any other aspects), an exemplary embodiment provides apparatus for obtaining positional information relating to an object which is operative to transmit a signal into a detection field and to detect a signal reflected from an object in the detection field, in which the spatial length of the transmitted signal during its propagation is approximately the same as (say between 50 and 200% or 75 and 150%) a dimension of the smallest objects (for example, posts, rails, human limbs, vehicle components and equipment, furniture, aircraft components, etc.) that the apparatus is intended to resolve. This may help to ensure that a reliable correlation can be achieved between signals received at different receiving elements.

In order that the position of objects can be resolved to an accuracy of several centimeters, the spatial length of the transmitted signal during its propagation is preferably, in order of magnitude, not greater than, say, 1.0 m, 0.3 m, 0.1 m, 0.03 m or 0.01 m.

Two similar, closely spaced objects may give similar return signals. If these signals are one half wavelength out of phase with each other, or thereabouts, the two signals could interfere destructively, resulting in little or no signal. In order to reduce the risk of destructive interference, the wavelength of the transmitted signal is preferably not very much shorter than the spatial length, or, put another way, each pulse of the transmitted signal may comprise only a few wavelengths. For example, the spatial length of the transmitted signal during its propagation may be less than 10 wavelengths, or less than 6, 5, 3, 2 or even 1 wavelengths, although pulses of longer than any of these values may also be provided. By restricting the number of wavelengths per pulse, the likelihood of destructive interference occurring due to two closely spaced objects is reduced.

If the receiving elements are spaced too far apart then ambiguities may be introduced due to signals arriving at respective receiving elements with a delay shift of more than a half wavelength. On the other hand, if the receiving elements are too close together there may be insufficient angular resolution. Thus will be appreciated that the choice of distance between receiving elements is a trade off between achieving reasonable angular resolution by having a sufficiently large distance between the receiving elements, and avoiding ambiguity by having a sufficiently small distance between the receiving elements. In preferred embodiments, the signal is received at the apparatus at receiving elements spaced by a distance being of the same order of magnitude as a characteristic wavelength $\lambda$ of the signal. For example, the receiving elements may be spaced apart by a distance $n\lambda$ where n is a real number and $0.5 \leq n \leq 10$, preferably $1 \leq n \leq 5$.

Time Scale Adjustment/Stretching

In preferred embodiments, the signal generating stage applies a series of m pulses to the transmitting element to cause it to transmit a signal at times $t_n$ where n=1, 2 ... m, such that at least a portion of the signal can be reflected from the object to be received by the receiving elements; and the detection stage detects a signal reflected to the receiving elements at times $r_n$ and generates an output signal representative of the received signal;

wherein the value of $r_n-t_n$ varies as some function of n.

By this arrangement, the flight time of a detected signal can be determined given only the knowledge of the value of n at which it was received and knowledge of the function of n.

For example, it may be that the value of $r_n-t_n$ changes linearly with n, or it may vary in some other manner, for example in a pseudo-random sequence.

In a typical embodiment, the value of $r_n-t_n$ increases or decreases linearly with n, by which it will be understood that the delay between a transmit time $t_n$ and a corresponding receive time $r_n$ increases or decreases linearly with n. Preferably, the delay varies from one pulse to an adjacent pulse; this can be a convenient way of putting the exemplary embodiments of the present system into practice. Although in one preferred embodiment the delay varies with each successive pulse, this is not necessarily the case; a first series of pulses at a first delay may be followed by a second series of pulses at a second, different, delay, and more than two different delays may be used. It will be appreciated that usually the delay is considered to be the delay with respect to the time at which the relevant pulse is transmitted.

Successive outputs of the detection stage may be stored in a storage means, the storage means being operable to output a signal of substantially the same shape as the received signal, but with a duration that is increased in time.

Preferably, in an exemplary embodiment of the present apparatus, the duration of each transmitted signal is less than the interval between transmitted signals. Most typically, the ratio between the duration of each transmitted signal and the mean interval between each transmitted signal is less than 1/10, for example less than 1/20 or 1/50, and greater than 1/1000, for example greater than 1/500 or 1/200.

Preferably, the detection stage is operable to detect the reflected signal during a detection aperture period, which is shorter than (preferably very much shorter than) the time between successive pulses. In this way, one or more (if a plurality of detection aperture periods is provided) so-called "range gates" may be provided, as described in WO97/14058; these might typically have widths corresponding to distances of between 1 and 2 cm. With the present apparatus, however, the range gates would move rather than, as in the prior art, remain stationary.

A timing stage may be provided to supplying timing signals to the detection stage and/or the signal generating stage. Preferably, the timing stage is adapted to operate the detection stage by means of a timing pulse. A timing pulse (or pulses) is an efficient way to generate the range gate (or gates).

Preferably, a plurality of spaced receiving elements is provided. With a sufficient number of elements a precise location of the object in space can be determined. Moreover, if as is preferred the transmitting elements have a wide beam and little individual angular resolution, sufficient elements can be provided so that the angular position of objects can be determined by trilateration; that is, by precise path-length comparison.

Preferably the apparatus further comprises a computation stage for processing signals detected by the detection stage, determining the time interval between a single reflected signal arriving at a plurality of the receiving elements, and thereby obtaining positional information relating to the object from which the signals were reflected.

The signal generating means preferably operates in an operation cycle to generate a sequence of spaced pulses simultaneously with or at a fixed time after each of a plurality of transmitting trigger instants. The detection stage may be adapted to detect the signals from the receiving elements simultaneously with or at a fixed time after each of a plurality of receiving trigger instants, each of which occurs at a time in predetermined relation to the transmitting trigger instants. For example, for each transmitting trigger instant $t_n$, a corresponding receiving trigger instant may occur at $r_n$, the time interval $r_n-t_n$ being a predetermined function of n. In such a system, the interval $r_n-t_n$ may be a function of the general form of $T_0+nT$ where $T_0$ and T are constants and n=1, 2 ... m.

Preferably the value of t/T (that is, the ratio between the mean interval between transmit trigger instants and the increment in the delay between transmit and receive trigger instants) is of several orders of magnitude; for example, t/T may be between $10^3$ and $10^7$, or between $10^4$ and $10^6$, typically about $10^5$.

By arranging the value of $r_n-t_n$ to increase (or decrease) as a function of n the received signals may be stretched in the time domain by a factor of t/T, as will now be explained.

The output of the detection stage may be fed to a storage means, such as a capacitor or a sample and hold stage, which stores the value of the signal which is received at each receiving trigger instant $r_n$. The signal received at a receiving trigger instant $r_n$ may thus be stored until the next receiving trigger instant $r_{n+1}$ (that is, the signal is sampled and held at each receiving trigger instant) Since each receiving trigger instant has a slight increment T in the delay from the corresponding transmit trigger instant, the value of the signal stored by the storage means changes with each new trigger instant. It therefore takes t/T repetitions to complete the waveform.

Assuming that the reflected signal is essentially unchanged between trigger instants (such as is the case if the object does not move significantly relative to the transmitting and receiving elements), then a strobe effect takes place which results in the detected signal being stretched by a factor of t/T. In this way the output of the storage means may be of duration greater than that of the received signals by a factor t/T and of frequency less than that of the received signals by a factor t/T.

The last-described arrangement can stretch the received signal in time without changing the signal shape. This is beneficial because it can reduce by a factor of t/T the frequency at which the computation stage can operate. The value of t/T may be considered as a constant divisor of frequency and multiple of time. This allows processing of signals output from the detection stage to take place at a frequency substantially less than the frequency of the received signal, with a consequent advantage in complexity and cost of processing apparatus.

Thus the apparatus may further comprise a storage means for storing values of the output signal corresponding to signals received at times $r_n$. The storage means may be operable to output a signal of substantially the same shape as the received signal, but with a duration which is increased in time (by a factor of t/T).

Sampling Stage/Single Control Line

An apparatus in accordance with an exemplary embodiment may include a sampling stage operative under the control of the timing stage selectively to pass or to interrupt the passage of signals from the receiving elements to the detection stage. The sampling stage may pass signals to the detection stage for an aperture time $t_a$.

Typically, such apparatus comprises a respective sampling stage for each receiving element. Advantageously, each sampling stage is connected to the timing stage by a respective signal delay line, within which delay line a signal is delayed by a time not less than $t_a/2$. This ensures that signals cannot travel from one sampling stage to another through the timing stage during the aperture time, thereby minimising crosstalk between the sampling stages.

To facilitate processing of the received signals, the detection stage typically includes an analogue to digital conversion stage such that the output of the detection stage is a digital signal. The output of the detection stage advantageously includes an indication of the amplitude of the received signals.

From a further aspect, an exemplary embodiment provides apparatus for obtaining positional information relating to an object according to any preceding claim, contained within a single housing. Such apparatus may be hand-holdable in use. For example, the apparatus may be intended to provide information about the location of objects within a wall.

Advantageously, an apparatus may comprise an antenna array and processing means constructed as a single assembly. In such embodiments, the processing means operates to provide all functional electrical signals to and receive all functional electrical signals from the array.

An apparatus in accordance with an exemplary embodiment may be intended for use in a vehicle.

Angle Measurement in Vehicle Radar

Apparatus for obtaining positional information relating to an object, according to any aspect, is advantageously contained within a single housing. Such apparatus may be particularly for use in a land vehicle. This may greatly simplify its installation, for example, in a vehicle. Such apparatus may alternatively be hand-holdable for use. This is of particular application in cases where the apparatus is embodied in a hand-held tool, such as a device for obtaining information about objects within a wall.

This feature may be provided independently. Accordingly there is apparatus for obtaining positional information relating to an object which is advantageously contained within a single housing. Such apparatus may be particularly for use in a land vehicle. This may greatly simplify its installation, for example, in a vehicle. Such apparatus may alternatively be hand-holdable for use. This is of particular application in cases where the apparatus is embodied in a hand-held tool, such as a device for obtaining information about objects within a wall.

From a fifth aspect (which may optionally be provided in any combination with any other aspect), an exemplary embodiment provides an apparatus for obtaining positional information relating to an object, for use on a vehicle, for resolving the angular position of an object preferably using non-Doppler radar.

There may also be provided with any aspect, particularly for a land vehicle, for obtaining positional information relating to an object, apparatus for comprising:

means for transmitting a probe signal towards the object;

means for receiving, at a plurality of spaced apart locations, the probe signal as returned by the object; and detecting means, coupled to the receiving means, for detecting the relative timing of the returned probe signals as received at the plurality of locations;

whereby the positional information for the object can be determined from said relative timing.

Apparatus, particularly for a land vehicle, for obtaining positional information relating to an object, embodying any combination of aspects for use on a vehicle may be for obtaining positional information relating to an object external of or internal to the vehicle, the apparatus being operative to generate 3-dimensional positional data for the object. This can, for example, provide an operator of the vehicle with a warning of an obstruction risk, or it may override controls of the vehicle.

Alternatively or additionally, apparatus embodying any combination of aspects for use on a vehicle may be for obtaining positional information relating to an object internal to the vehicle, the apparatus being operative to generate 3-dimensional positional data for the object.

Typically, such apparatus has a detection field within a passenger compartment of the vehicle.

In apparatus according to any of the last three preceding paragraphs, the positional data may include at least one of the range, azimuth and elevation of the object.

Most typically, the antenna array of an exemplary embodiment for use on a vehicle is carried on a fixed location on the vehicle. Advantageously, the antenna array is located within a component of the vehicle, preferably a non-metallic component. Thus, visual conflict with the styling of the vehicle can be avoided and the array can be protected. For example, the antenna array may be located within a bumper (or other portable enclosure) of the vehicle, such as a (preferably a non-metallic) bumper, from which it can generate a detection zone to the front or to the rear of the vehicle.

In (for example) a vehicle installation, an exemplary embodiment of the present apparatus may further comprise alerting apparatus for alerting a vehicle driver to the presence of a detected object. Such apparatus may provide to the driver (or another person, or a user of the apparatus, as the case may be) information that would otherwise be unavailable.

In such embodiments, the alerting apparatus is operative to generate an audible warning, which, for example, may include a verbal warning that may convey information about detected object(s). Alternatively or additionally, the alerting apparatus may be operative to generate a visual warning. For example, the visual warning may include a visible representation (an image) of the position of an object detected by the apparatus.

An exemplary embodiment of the present apparatus may further comprise a display upon which is presented a visual representation e.g. an image of a detection field of the apparatus and an object within the detection field.

Imaging/Pattern Matching

From a sixth aspect (which may optionally be provided in any combination with any other aspect), an exemplary embodiment provides an apparatus for obtaining positional information relating to an object, for use on a vehicle, preferably using non-Doppler radar and being operative to determine a radar cross-section of an object.

From a seventh aspect (which may optionally be provided in any combination with any other aspect), an exemplary embodiment provides an apparatus, particularly for use on a (for example land) vehicle, for obtaining positional information relating to an object, including a transmitting element for transmitting radiation into a detection field, a receiving element for receiving radiation reflected from an object in the detection field, and a processing stage, which is operative to analyse the signals from the receiving element to derive qualitative information relating to the object. This permits the apparatus to provide extended data relating to objects that it detects.

For example, the processing stage may be operative to compare information relating to an object at successive different angular positions against a look-up table. This allows variation in the gain of the antenna array with angle to be accounted for.

The processing stage may be operative to determine a radar cross-section of the object. In such embodiments, the processing stage may be operative to compare the radar cross section with a threshold value of radar cross-section and to generate a warning signal in dependence upon the result of the comparison.

Alternatively or additionally, the processing stage may be operative to determine an evolution of angular position of an object with time. In one example, the processing stage is operative to determine the rate of change of angular position of the object. In another example, the way in which the angular position evolves with time is determined. By determining not just the rate of change of angular position, but also how the angular position varies with time, the accuracy with which the relative movement of the vehicle and the object can be predicted is increased.

For example, if the vehicle is moving towards a curb which is below the level of the sensor, the vertical angular position of the curb will change as a hyperbola as the vehicle moves towards and over the curb. By defining the characteristic hyperbola, the movement of the vehicle relative to the curb can be predicted. In this way, it can be predicted whether the vehicle will hit the curb or not, and by how much the vehicle will miss the curb.

In another example, if the vehicle is moving towards an object, such as a post, which is not directly in the line of travel, then the horizontal angular position of the object will change as a hyperbola as the vehicle moves towards and past the object. By defining the characteristic hyperbola, it can be predicted whether or not the vehicle will hit the object, and by how much.

In a further example, if, as the vehicle moves, a target not on the centre line maintains a constant angular position as the vehicle moves, this may indicate a hazard such as a moped which is moving alongside the vehicle at the same speed.

The above situations may be also be analysed by considering how the distance away from the object changes as a function of distance moved by the vehicle. For example, if the distance away from an object changes as a straight line against distance moved by the vehicle then it may be predicted that the vehicle will hit the object, and the point of collision may be predicted by extrapolating the line. If the distance away from the object changes as a curve against distance moved, then it may be predicted that the vehicle will miss the object. The amount by which the vehicle will miss the object, and the point at which the object will be closest to the vehicle, may be predicted by estimating the evolution of the curve.

Thus the processing stage may be operative to predict a path of movement of the object, preferably relative to the apparatus.

If the evolution of the angular position of the object differs from that which would be produced by a point object, then it may be inferred that the object has an irregular outline, and the outline of the object may be predicted based on the difference. For example, if the vehicle is moving towards an object (such as another vehicle) with a curvilinear outline, the radar may see the nearest point of the object, but not the part of the object closest to the path of the vehicle. By predicting the outline of the object, it can be predicted where the vehicle will hit the object, even if that part of the object is not yet visible.

An exemplary embodiment further provides apparatus for obtaining positional information relating to an object substantially as herein described with reference to the accompanying drawings.

Applications

From an eighth aspect, an exemplary embodiment provides a vehicle equipped with apparatus embodying any of the above-mentioned aspects.

More specifically, an exemplary embodiment may provide a (preferably motor) road vehicle being equipped with a driver warning system comprising apparatus embodying any of the above-mentioned aspects for obtaining positional information relating to an object external of the vehicle, the apparatus being operative to generate 3-dimensional positional data for the object. In such a vehicle, the array of the apparatus may be contained within a non-metallic bumper of the vehicle.

A vehicle embodying this aspect of the exemplary embodiment may comprise a display instrument operative to process information obtained by the apparatus and to generate a display therefrom for an operator of the vehicle.

From a ninth aspect, an exemplary embodiment provides a control system for air bags in a vehicle, the control system comprising an exemplary embodiment of the present apparatus, in which the processing stage is operable to determine the occupancy of a seat equipped with a passenger air bag, and to suppress deployment of the bag in dependence on the occupancy of the seat. For example, the processing stage may be operable to determine whether or not the seat is occupied and to suppress deployment of the bag if the seat is unoccupied, and/or to determine if the occupant is too close to the air bag (such that release of the air bag would represent a hazard to the occupant) and to suppress deployment of the bag if the occupant is too close.

This exemplary embodiment also provides embodiments being hand-held tools and devices for obtaining information about objects within a wall comprising a apparatus according to any of the preceding aspects.

Antenna Array

From a tenth aspect, an exemplary embodiment provides an electromagnetic (for example, microwave) antenna array optionally for use in combination with any other aspect, the array including a transmitting element and a plurality of receiving elements, the transmitting and receiving elements being disposed on a common substrate.

This feature of the exemplary embodiment may be provided independently. Accordingly the exemplary embodiment provides an electromagnetic (for example, microwave) antenna array, the array including a transmitting element and a plurality of receiving elements, the transmitting and receiving elements being disposed on a common substrate.

An elecromagnetic antenna array embodying this aspect may include a single transmitting element, or a plurality of transmitting elements.

An elecromagnetic antenna array embodying this aspect may include three (or more) receiving elements arranged non-collinearly. For example, the receiving elements are arranged substantially at the vertices of a right-angled triangular locus (that is, in an L-shaped pattern).

In one exemplary embodiment there is an elecromagnetic antenna array optionally for use in apparatus for obtaining positional information relating to an object, the array including a transmitting element and at least three receiving elements arranged non-collinearly, the transmitting and receiving elements being disposed on a common substrate.

The receiving elements may be spaced apart by a distance that is the same order of magnitude as the wavelength $\lambda$ of the radiation that it is intended to transmit and receive. For example, the receiving elements may be spaced apart by a distance $m\lambda$ where m is less than 10, and preferably less than 8,5, 3 or 2, and m is greater than 0.1, and preferably greater than 0.2, 0.3, or 0.5.

The efficiency with which the elements can radiate or detect radiation decreases as the size of the elements decreases, since the radiation impedance of the elements may decrease with size, and thus the elements themselves should not be too small. On the other hand, the elements should not be too large, because they may become physically too big for the array, and because grating lobe effects may occur at larger sizes. In general, the size of the elements (whether receiving or transmitting) is preferably less than $10\lambda$ or $4\lambda$ and greater than about $\lambda/4$. In preferred embodiments, the size is in the region of $\lambda/4$ or $\lambda/2$, although other values may be used. In one particular example, the elements have a size of about 1.5 cm with a wavelength of about 5 cm.

More advantageously, an elecromagnetic antenna array according to the present aspect may include four receiving elements arranged non-collinearly. For example, the receiving elements may be arranged substantially at the vertices of a quadrilateral locus, more specifically, a trapezoidal or rectangular locus, in which the quadrilateral has long and short parallel sides.

In accordance with this aspect the elecromagnetic antenna array may include at least three receiving elements arranged non-collinearly such that there is an axis about which the array is asymmetrical.

This feature may be provided independently. Accordingly there is an elecromagnetic antenna array including at least three receiving elements arranged non-collinearly such that there is an axis about which the array is asymmetrical.

In embodiments where the locus is a trapezium (that is, a quadrilateral having only two sides parallel), this arrangement can ensure that two unequally-spaced pairs of antennas in parallel planes can be selected, with dissimilar artefacts (for example, grating lobes) in their sensitivity patterns. Advantageously, the short side may be between 0.5 and 1 times (or approximately three-quarters of) the length of the long side. As a specific example, where the trapezial locus has long and short parallel sides, the length of the shorter side being approximately the wavelength $\lambda$ of the radiation that the array is intended to transmit and receive, and the length of the longer side is approximately $3\lambda/2$. By suitable processing of signals from such an array, the effect of grating lobes can be substantially reduced.

Alternatively, the quadrilateral may have two opposing angles which are substantially right angles, while the other two angles are not right angles. This arrangement can ensure that the main grating lobe for each will point in the correct 3-D direction, while the artefacts will be different, and thus will cancel out.

More generally, to achieve the advantages discussed in the last-preceding paragraph, the exemplary embodiment may provide a microwave antenna array for use in apparatus for obtaining positional information relating to an object, which apparatus may be in accordance with any other aspect, the array including a transmitting element and a plurality of receiving elements, in which the spacing of two pairs of (the) receiving elements in a common direction is unequal. This can be achieved in a wide range of embodiments, including that discussed above.

Further Aspects

From an eleventh aspect, an exemplary embodiment provides an electromagnetic sensor for use on a vehicle, whether ground-, water- or air-borne, contained in a single enclosure, comprising timing control means, transmitting means, receiving means, processing means and interface means, in which:

said transmitting means includes a fixed antenna capable of emitting a sequence of short pulses of electromagnetic radiation in the ultra-high-frequency microwave or millimeter wave band in response to trigger signals from said timing means into a field of view in excess of +/−15 degrees in width and +/−10 degrees in height from a pointing direction of the antenna, said receiving means is responsive to further trigger signals from said timing means and includes one or more fixed receive antennas responsive to signals corresponding to received fractions of such pulses after transmission, propagation to and scattering from one or more obstacles within such field of view, adapted to convert such signals to signal information in which each frequency component of such signal is converted to a respective component of such signal information at a frequency related to such frequency component by a constant divisor for all such respective frequency components, said processing means is adapted to acquire said signal information thus responsive to said received fractions at each of said receive antennas and calculate information concerning said obstacles, said interface means are adapted to communicate either to a user of said vehicle or to other electronics systems on the vehicle, which is adapted to measure and provide via such interface means indications of the presence or absence of one or more obstacles within a volume which is not coextensive with the field of view of said antennas and can be defined independently of such field of view.

In a sensor according to the last-preceding paragraph the processing means may be adapted to provide via such interface means information concerning the distances, azimuth angles and elevation angles from said sensor to said one or more obstacles.

In a sensor embodying this aspect, the said volume may be contained within one or more surfaces, such as a plurality of effectively planar surfaces. The processing means may also be adapted to provide via such interface means indications of the reflecting strength of the obstacle, proportional to its radar cross section, and independent of its distance or position in the field of view of the sensor.

In typical embodiments the antenna array is fixed with respect to its mounting; that is to say, it does not rotate.

A preferred embodiment of sensor according to this aspect is adapted to fit within a bumper (or other portable enclosure) of a vehicle, or within a handheld tool or enclosure.

From a further aspect, the exemplary embodiment provides apparatus for obtaining positional information relating to one or more objects, the apparatus being operative in an operating cycle for each of m steps in which n=1, 2 . . . m, the apparatus including:

a signal generating stage operative, simultaneously with or at a fixed time after a transmitting trigger instant $t_n$ to generate a signal, and a transmitting element to transmit said signal into a detection field;

a plurality of spaced receiving elements operative simultaneously with or at a fixed time after a receiving trigger instant $r_n$ to receive a portion of the signal reflected from one or more objects in the detection field, the interval $r_n-t_n$ varying as a function of n and having a magnitude in a range corresponding to the times of travel of a signal reflected from an object within the detection field;

means for identifying the values of n at which signals reflected from one object are received at two or more receiving elements and thereby detecting the time taken, and therefore the distance travelled, by the signals from the transmitting element to the various receiving elements; and means for calculating the position of the object from the various path lengths thereby identified.

In an electromagnetic imaging sensor according to this aspect, the transmitting and/or the receiving means are embodied in a single microchip, with the associated antenna elements printed on one or more adjacent printed circuit cards, and the timing signal generator means and control and processing means are embodied in the same single microchip. The transmitting means may comprise a semiconductor switching device or amplifier external to the said single microchip. Moreover, the receiving means may comprise one or more semiconductor switching devices or amplifiers external to the single microchip. More specifically, both transmitting and receiving means may comprise external semiconductor switching devices or amplifiers, and the timing signal generator and control and processing means are embodied in a single microchip. Yet more specifically, both transmitting and receiving means comprise semiconductor switching devices or amplifiers, and the timing signal generator and control and processing means may be embodied in two separate microchips.

Receiving means of embodiments of this aspect may comprise switching samplers in which the switch may be closed for an aperture time less than or comparable with one half the period of said dominant period. In such embodiments, the switches may all be closed by a common signal without intervening pulse generating circuits. Advantageously, the switching amplifiers may be electrically separated by lengths of transmission line whose electrical length exceeds or is comparable to one half the duration of said aperture time.

The antennas in this aspect may be stacked microstrip patches. Suitably, the stacked microstrip patches may be fed by slots in the circuit card carrying the transmitting means.

The delay measurement process may, in preferred embodiments, include a cross-correlation process. Such a correlation process may be a truncated correlation process in which the range of the correlation is calculated between the signals received by any two elements is related to the spatial separation of those two elements. For example, the delay measurement process comprises measurement of the timing difference between comparable features of the waveform such as zero-crossings, peaks, troughs, etc.

The control and processing means of this aspect may also comprise classification means to identify classes of object near to a vehicle by pattern matching with said image.

The said distance and said angular position of each said object may be used to identify the positions of a plurality of said objects in two or three dimensions. The positions of said plurality of said objects may be combined to form an image of the contents of the space near or in front of the sensor.

In embodiments of this aspect, the control and processing means may comprise or may be connected to further processing means in which successive such images or the signals from which they were generated are used in a synthetic aperture or inverse synthetic aperture process to further detail the image of the contents of the space near or in front of the sensor. Such an imaging sensor may store digitally a description of a volume of space near the antenna. The volume of space may be other than a sphere or ellipsoid. Moreover, the measured position of each such object may be compared with such volume of space near the antenna to determine its location inside or outside such volume.

The processing means may store a description of the gains of the antennas as a function of solid angle. The measured position of each object may be used with such description of the gains to determine the gain of each of the antennas in that direction. In such embodiments (and others), the measured signal strength arising for each object may be divided by the product of the antenna gains corresponding to its position and multiplied by the fourth power of the measured range to provide a value proportional to its radar cross-section. For example, the derived value of radar cross-section may be compared with a cross-section threshold to determine the significance of the target. The cross-section threshold may be divided by the fourth power of the measured range and multiplied by the product of the antenna gains in the direction of the object before comparison with the measured signal strength.

Exemplary embodiments also provide apparatus according to any of the above-defined aspects for generating an image of objects within or through a solid object. Typically, the solid object may be a wall.

Further exemplary embodiments provide apparatus according to any of the above-defined aspects for providing an image of an environment in conditions that human vision is compromised. For instance, vision may be compromised by the physiological condition of a user (such as a physical handicap). Alternatively, vision may be compromised by environmental conditions, such as darkness, smoke or fog.

Method Aspects

Angular Resolution by Cross-Correlation

From a first method aspect provides a method for obtaining positional information relating to an object, optionally in apparatus in accordance with any one of the preceding aspects, comprising:

applying a series of pulses to a transmitting element of an array to cause it to transmit a signal, such that at least a portion of the signal is reflected from the object to be received by the receiving elements;

detecting signals reflected to receiving elements of the array and generating output signals representative of the received signals; and applying a truncated cross-correlation function to the output signals to detect the interval between signals received by a plurality of the receiving elements, whereby to determine an angular position of an object from which the transmitted signal has been reflected.

Preferably the truncated cross-correlation function comprises shifting one output signal with respect to another over a range which is less than the duration of the signals and preferably less than the duration of a pulse. For example, the truncated cross-correlation function may comprise shifting one output signal with respect to another over a range in which the maximum offset in either direction is less than 5 times the time that would be taken for the transmitted signal to travel directly from one receiving element to another, and preferably less than or equal to 3, 2 or 1 times this value.

The signal may have a characteristic wavelength $\lambda$ and the truncated cross-correlation function may have an interval of correlation which is a small multiple of $\lambda$. For example, the interval of correlation may be less than 10, 5, or 2 $\lambda$, or even $\lambda$. As a minimum, the cross-correlation function is applied over two samples, although preferably a greater number of samples is used.

In a method embodying this aspect in which the receiving elements are spaced apart by a distance D, the truncated cross-correlation function may have an interval that is less than a small multiple of D. The interval of correlation may be less than 5, 2, 1.5 or 1D.

Such a method may further include determining the distance from the array of an object from which a signal has been reflected. This can, for example, be achieved by multiplying the time taken for the signal to be received by the speed of propagation of the signal. Typically, a maximum value of the cross correlation function is identified.

A method in accordance with an exemplary embodiment may further include a step of determining the distance from the array of an object from which a signal has been reflected. This may be achieved by multiplying the time taken for the signal to be received by the speed of propagation of the signal.

The first method aspect also provides a method of obtaining positional information relating to an object, optionally including any of the above mentioned features, the method comprising:

transmitting a signal for at least partial reflection by the object;

receiving signals reflected by the object; and applying a truncated cross-correlation function to received signals, thereby to determine a position of the object.

In the simplest case the signals are received by two receiving elements and the interval between signals received by those two receiving elements is determined. If more than two receiving elements are provided, a truncated cross-correlation function may be applied to some or all of the various pairs of received signals, such that a plurality of angular positions are determined. In this way the accuracy of the measurement may be improved and/or another dimension added to the measurement.

Thus, a method embodying this aspect may include the steps of:

determining the interval between a signal being received by a first set of any two or more of the receiving elements;

calculating a first angular position of an object from which the transmitted signal has been reflected;

determining the interval between a signal being received by a second set of any two or more of the receiving elements (which may include one or more of the elements of the first set); and calculating a second angular position of an object from which the transmitted signal has been reflected.

Preferably, the first and second angular positions are measured in planes that are substantially non-parallel to one another, and more optionally, the said planes are approximately normal to one another.

The method may include determining a coordinate in three-dimensional space of an object from which the transmitted signal has been reflected.

In a method in accordance with an exemplary embodiment at least one of the first and second set of receiving elements includes three or more elements which may be disposed such that that set includes at least two pairs of elements, the spacing of elements in the two pairs being unequal. In an advantageous embodiment, the spacing (D) between the elements of one pair is approximately equal to (for example between 50% and 200% or between 75 and 150% of) a characteristic wavelength $\lambda$ of the signal, and preferably the spacing between a second pair of elements is approximately equal to $3\lambda/4$, or 3 D/4, and preferably the ratio of the spacing of the elements in one of the first and second pairs to the spacing of the elements in the other of the first and second pairs is between 0.5 and 1 or 0.75 and 0.9. In such embodiments, a truncated cross-correlation may be performed between the signals received by each pair of elements and the product of the result of the cross-correlations may be determined.

A method in accordance with an exemplary embodiment of the present apparatus may further comprise generating an output for presentation of positional information relating to the object to a user. The output may include at least one of an audible and a visual signal.

Warning Zone

From a second method aspect, an exemplary embodiment provides a method for obtaining positional information relating to an object, optionally in combination with the first aspect, comprising:

defining a warning zone within a detection field; and
determining whether a detected object is within the warning zone:
wherein the warning zone is preferably defined as a three-dimensional region within the detection field.

Typically, the warning zone is contained within and is smaller than the detection field. Moreover, the shape of the warning zone may be dissimilar from the shape of (and/or may be smaller than) the detection field. Preferably the method includes the step of determining the position of a detected object within a detection field.

The warning zone may include a region defined in two dimensions within the detection field. For example, the warning zone may be a planar surface within the detection field. Alternatively, the warning zone may be defined as a three-dimensional region within the detection field.

The warning zone may be defined by an algorithm as a function of a coordinate within the detection field. Alternatively or additionally, the warning zone may be defined by at least a limiting value of one or more ordinates of a coordinate within the detection field. For example, the warning zone may be defined by at least a limiting value of one or more angles of a polar coordinate within the detection field. Moreover, the warning zone may be defined by at least a limiting value of a range of a polar coordinate within the detection field. The warning zone may include a plurality of discontinuous spatial regions.

A preferred method according to this aspect further includes generation of a co-ordinate of a detected object. In such a method, the generated co-ordinates may be compared with co-ordinates of the warning zone to determine whether the object is within the warning zone.

A method in accordance with an exemplary embodiment may further comprise the step of generating an output signal indicative that the object is within the warning zone. Typically, the method further comprises the step of issuing a warning to a user upon detection of an object in the warning zone.

In a modification to a method in accordance with an exemplary embodiment, there is defined a plurality of non-coextensive warning zones. In such embodiments, there may be included a step of generating an output signal indicative of which of the plurality of warning zones contains the object.

In another development of this aspect the method may further comprise the step of analysing a characteristic of an object outside of the warning zone. The step of analysing a characteristic may comprise tracking an object outside the warning zone and predicting its entry into the warning zone.

Typical methods embodying the exemplary embodiment further comprise a step of issuing at least one of an audible and a visual warning to a user upon detection of an object in a warning zone.

A method embodying this aspect may be carried out on a vehicle. In such methods, at least one of the shape and a relevant dimension of a warning zone may be at least in part determined by a corresponding shape and dimension of the vehicle.

A method as set forth in the last-preceding paragraph typically includes monitoring operating conditions of the vehicle and changing at least one of the shape and a relevant dimension of the warning zone in response to vehicle operating conditions. Such operating conditions my include (amongst other possibilities) at least one of speed, direction of travel, and ambient environmental conditions. For example, the distance to which the warning zone extends in the direction of travel of the vehicle may be increased with the speed of the vehicle. Alternatively or additionally, the extent to which the warning zone extends to one side of a longitudinal axis of the vehicle may be increased in a direction in which the vehicle is turning.

Frequency Considerations

In a method embodying an exemplary embodiment, the signal is most typically an electromagnetic signal. More specifically, in a method embodying the exemplary embodiment, the electromagnetic signal is most typically microwave radiation. For example, the electromagnetic signal may have a frequency of between 0.5 or 1 and 77 GHz, of between 2 and 25 GHz, or it may be approximately one of 0.5 GHz, 1 GHz, 6 GHz, 10 GHz or 2–2.5 GHz. For example, the frequency of the electromagnetic signal may be approximately 2.45 GHz. The transmitted signal may typically have a relative bandwidth (say, to centre frequency) of approximately 15%, preferably between 3 and 30%, 5 and 25%, or 10 and 20%. The transmitted signal may have a relative bandwidth to the centre frequency between 10 and 20%, between 5 and 25%, between 3 and 33% or approximately 15%.

In a method embodying any of the last three preceding paragraphs, an angular position of an object may be resolved with respect to a predetermined datum.

From a third method aspect, an exemplary embodiment provides a method of obtaining positional information relating to an object, optionally in combination with any of the other method aspects, comprising transmitting a signal into a detection field and detecting a signal reflected from an object in the detection field, in which the spatial length of the transmitted signal during its propagation is approximately the same as a dimension of the smallest object that the apparatus is intended to resolve.

In such a method, the spatial length of the transmitted signal during its propagation may be, in order of magnitude, not greater than say, 1.0 m, 0.3 m, 0.1 m, 0.03 m or 0.01 m. For example, the spatial length of the transmitted signal during its propagation may be less than 10 wavelengths, or less than 6, 5, 3, 2 or even 1 wavelengths.

Typically, in a method embodying this aspect, the signal is received at receiving elements spaced by a distance being of the same order of magnitude as a characteristic wavelength $\lambda$ of the signal. More specifically, the receiving elements may be spaced apart by a distance $n\lambda$ where $0.5 \leq n \leq 10$, or $1 \leq n \leq 5$.

Time Scale Adjustment/Stretching

A method embodying this aspect may include a series of pulses comprises m pulses to cause the transmitting element to transmit a signal, at times $t_n$ where n=1, 2 . . . m; and reflected signals are detected by the receiving elements at times $r_n$; comprising the steps of generating an output signal representative of the received signal; wherein the value of $r_n$–$t_n$ varies as some function of n.

In preferred embodiments of a method embodying this aspect, the value of $r_n$–$t_n$ changes linearly with n. Alternatively, it may vary in some other manner, for example in a pseudo-random sequence.

Preferably the method further comprises storing values of the output signal corresponding to signals received at times $r_n$. The method may further comprise outputting a signal of substantially the same shape as the received signal, but with a duration which is increased in time. For example, the duration may be increased by several orders of magnitude, for example, by between $10^3$ and $10^7$, or between $10^4$ and $10^6$.

Angle Measurement in Vehicle Radar

From a fourth method aspect, an exemplary embodiment provides a method for obtaining positional information relating to an object, performed on a vehicle optionally in combination with any other method aspect, for resolving the angular position of an object using non-Doppler radar.

A method in accordance with an exemplary embodiment may be performed on a vehicle for obtaining positional information relating to an object external of the vehicle, in which 3-dimensional positional data for the object is generated.

A method in accordance with an exemplary embodiment may be performed on a vehicle for obtaining positional information relating to an object internal to the vehicle, in which 3-dimensional positional data for the object is generated. In a method embodying the exemplary embodiment, a detection field may be within a passenger compartment of the vehicle.

Positional data obtained by a method embodying the exemplary embodiment may include at least one of the range, azimuth and elevation of the object.

A method in accordance with an exemplary embodiment may be carried out by apparatus including an antenna array that is carried on a fixed location on the vehicle. Such an antenna array may be located within a (preferably non-metallic) component of the vehicle. For example, the antenna array may be located within a (preferably non-metallic) bumper of the vehicle.

A method in accordance with an exemplary embodiment may further comprise a step of alerting a vehicle driver to the presence of a detected object. In such embodiments, the alerting step may include generating an audible warning. The audible warning may, for example, include a descriptive verbal warning. Alternatively or additionally, the alerting step may include generating a visual warning. The visual warning may include a visual representation (an image) of the position of detected objects. Such a method may further comprise a step of presenting a visual representation of a detection field and objects within the detection field.

Imaging/Pattern Matching

From a fifth method aspect, an exemplary embodiment provides a method for obtaining positional information relating to an object, performed on a vehicle optionally in accordance with any other method aspect, using non-Doppler radar, the method including determining a radar cross-section of a object.

From a sixth method aspect, an exemplary embodiment provides a method for obtaining positional information relating to an object, optionally in accordance with any other method aspect, including transmitting radiation into a detection field, receiving radiation reflected from an object in the detection field, and in an analysis step analysing the signals from the receiving element to derive qualitative information relating to the object.

In a method embodying this aspect, a radar cross-section of the object may be determined. The radar cross section may be compared with a threshold value of radar cross-section and a warning signal may be issued in dependence upon the result of the comparison. Alternatively or additionally, in such a method, an evolution of angular position of an object may be determined, and/or a path of movement of the object may be predicted.

In the analysis step of a method embodying this aspect, the signals may be modified to compensate for angular variation in sensitivity of the receiving element. Moreover, in the analysis step the signals may be modified to account for the range of the object from which the signals are reflected.

In a method embodying this aspect, the analysis step may include making a comparison between the received signal and a pattern corresponding to signals received from a known class of objects. Such an analysis may include identification of characteristic features of the received signals. The characteristic features may include at least one of minima, maxima and zero-crossings.

This exemplary embodiment also provides a method for obtaining positional information relating to an object substantially as herein described with reference to the accompanying drawings.

From another aspect, an exemplary embodiment provides a method of controlling deployment of air bags in a vehicle, in which a method according to any other method aspect is applied to determine the occupancy of a seat equipped with a passenger air bag, and deployment of the bag is suppressed in dependence on the occupancy of the seat, for example, if the seat is unoccupied or if the occupant is too close to the air bag.

A portion of the signal emitted from the transmitting element will propagate directly to the receiving elements without being reflected off an object in the detection field. This will be detected at the receiving elements a very short time after the transmitting trigger instant with the result that the ability of the apparatus to resolve objects at short range may be limited. The receiving elements may be disposed in a symmetrical relationship with the transmitting element whereby such signals will be detected by the receiving elements substantially simultaneously and with a substantially similar signal shape. This arrangement can simplify the processing required to compensate for the existence of these signals. However, in some circumstances the best results may be obtained if the receiving elements are not in a symmetrical relationship.

From another aspect, an exemplary embodiment provides a method of obtaining positional information relating to an object, preferably in apparatus as aforesaid, the method comprising an operating cycle having m steps in which n=1, . . . m, each step comprising:

(a) generating a signal at a given timing relationship with respect to a transmitting trigger instant $t_n$ and transmitting it into a detection field; and (b) receiving at a given timing relationship with respect to a receiving trigger instant $r_n$ at least a portion of the signal reflected from the object;

wherein the interval $r_n - t_n$ varies as a function of n.

Preferably the method further comprises: c) providing at least two (preferably spaced) receiving elements and identifying the values of n at which signals reflected from the object are received by the receiving elements. In this way, the time taken, and therefore the distance travelled, by the signals from the transmitting element to the various receiving elements can be determined.

In this method, step c) typically includes a step of cross-correlation of the signals received by two of the receiving elements. Preferably the cross-correlation function is a truncated cross-correlation function and comprises shifting one output signal with respect to another over a range which is less than the duration of the signals. Typically one output signal is shifted with respect to another over a range in which the maximum offset in either direction is less than the time that would be taken for the transmitted signal to travel directly from one receiving element to another.

In order to resolve a three-dimensional position of the object, step c) preferably includes a plurality or even multiplicity of steps of cross-correlation of the signals received by various of the receiving elements.

More information about the position and/or the nature of the object from which the signals were reflected may be obtained by including in step c) a comparison of the amplitude of signals received by various of the receiving elements. Moreover, step c) may include comparison of characteristic features of the received signals, such features including at least one of zero-crossings, maxima and minima.

In a preferred embodiment of this process, in which the correlation coefficient is approximately a cosinusoidal function of each offset angle $(\theta-\theta_0)$, where $\theta_0$ is the angle offset of the object in the plane containing the relevant antenna pair and the antenna boresight direction), it may not be necessary in step c) to carry out a finely-stepped cross-correlation, but to determine the correlation coefficients at a small sample of angles, separated by less than half the sinusoidal wavelength, to estimate the direction of the maximum, followed by further samples close to that direction to refine the estimate. This further shortens the truncated cross-correlation process.

After carrying out the truncated cross-correlation process, the method may include a step of selecting reflections denoted by correlation maxima which exceed a predetermined signal threshold (which may depend on the noise amplitude observed), and dividing each such correlation maximum by the gain of the transmitting and receiving antennas in the measured direction. Each such correlation maximum may then be multiplied by the fourth power of the measured range, to obtain a value proportional to the radar cross-section of the object. This value may then be compared to a cross-section threshold such that objects whose cross-section exceeds such threshold are reported or may be subjected to further processing.

In a further processing step each three-dimensional position determined in step c) may be compared with a description, either in the form of a look-up table or of an algorithm, which describes a volume of space near the antenna. The space may be selected such that the presence of an object within it is of relevance to a particular situation in which the method is being employed. This space will be referred to as "the warning zone". Objects that are found to be within the warning zone and which exceed either a signal threshold or a cross-section threshold may then be reported, may give rise to a warning, or may be subjected to further processing.

In general, the range of values of $r_n-t_n$ for $1 \leq n \leq m$ may cover a range of time within which it is expected that a signal reflected from the object will be received. This can ensure that a reflection can be received from an object located anywhere within an intended detection field of the apparatus.

Further Aspects

In a preferred apparatus in accordance with an exemplary embodiment, an array of electromagnetic antennas is used in conjunction with processing electronics in a wideband microwave or millimeter imaging sensor suitable for obstacle detection, proximity and approach sensing or inspection. Objects in the volume in front of the array are resolved in range so that substantially only one is found at any one value of range. The range of any such object is determined b the time of flight of a pulsed signal reflected from it, and its angular position is then resolved, as taught in published International patent application No. WO97/14058, by determining the relative times at which such signals received from that object arrive at different elements of the array. In exemplary embodiments an array is configured with two or more elements separated by a distance which is less than or comparable with the dominant wavelength in the radiated pulse; the signals are pre-processed by frequency scaling rather than or in addition to frequency shifting, and both angular resolution and high detection performance are obtained by processing a combination of the channel outputs according to the element separation to determine timing offsets and angular positions. Wide bandwidth combined with precise inter-element receiver timing allows many targets within the range of the sensor to be resolved in range and uniquely positioned in angle.

A method in accordance with an exemplary embodiment may provide an image of an environment in conditions that human vision is compromised. For example, vision may be compromised by the physiological condition of a user (e.g. due to a physical disability).

Alternatively or additionally which vision may be compromised by environmental conditions such as darkness, smoke or fog.

A method in accordance with an exemplary embodiment may also be applied to imaging within or through a solid object, such as a wall.

From yet another aspect, there is provided an electromagnetic imaging sensor comprising wideband signal transmitting means and a plurality of wideband receiving means, with associated antenna means in fixed relative positions within an assembly suitable for attachment to road vehicles or as portable equipment, timing signal generator means, control and processing means and connection means for connection to alarms, indicators or other systems, in which:

the transmitting means is operable to emit a train of electromagnetic pulses each less than or comparable with 1 nanosecond in duration, and characterised by a dominant wavelength or period, but containing substantially a small number of cycles of such wavelength or period, the receiving means and timing signal generator means are operable to control the transmitting means to emit electromagnetic pulses and the receiving means to receive reflections of such pulses from objects in the field of view of the sensor and convert them to signals in which each frequency component is reduced by a constant factor, and the time domain waveform is stretched by the inverse of the same factor, and the arrival time of each component at the receiving elements is measured, being proportional to the distance to the object, the pulses are of sufficiently short duration that reflections from such objects separated by a distance comparable with 0.1 meter or more in range are substantially resolved in time as they return to the receiving elements, the arrival times of the reflections from each such object at each receiving element are subjected to a delay measurement process to determine the relative delays in arrival and therefrom derive the direction of the arrival from that object, thus determining its angular position in one, two or three dimensions with respect to the array of antennas.

In an electromagnetic imaging sensor according to the last-preceding paragraph, the transmitting and/or the receiving means may be embodied in a single microchip, with the associated antenna feed elements printed on one or more adjacent printed circuit cards. The antennas themselves may be either part of the cards, or separate from them. The timing signal generator means and control and processing means are preferably embodied in the same single microchip. In such embodiments, the transmitting means may comprise a semiconductor switching device or amplifier external to the said microchip. Moreover, the receiving means may comprise one or more semiconductor switching devices, amplifiers, filters or pulse shaping networks external to the said microchip.

In one embodiment, both transmitting and receiving means comprise external semiconductor switching devices or amplifiers, and the timing signal generator and control and processing means are embodied in a single microchip. Alternatively, both transmitting and receiving means comprise semiconductor switching devices or amplifiers, and the timing signal generator and control and processing means are embodied in two separate microchips, or on a single chip.

In exemplary embodiments, the receiving means may comprise switching samplers in which the switch may be closed for an aperture time less than or comparable with one half the period of said dominant period.

Most preferably, the receiving means comprise switching samplers in which the switches are all closed by a common signal without intervening pulse generating circuits. In such embodiments, the switching samplers are advantageously electrically separated by lengths of transmission line whose electrical length exceeds or is comparable to one half the duration of said aperture time.

In a preferred construction, the antennas are patch antennas such as microstrip patches. This arrangement has advantages for manufacture. The antennas may be fed by a slotline feed in the circuit card carrying the transmitting means. Advantageously, the patches may be stacked patches. This arrangement assists in achieving the bandwidth necessary for the antennas.

The delay measurement process may include a cross-correlation process. Advantageously, the cross-correlation process is a truncated correlation process in which the range of the correlation determined between the signals received by any two elements is related to the spatial separation of those two elements. Additionally or alternatively, the delay measurement process comprises measurement of the timing difference between comparable features of the waveform such as zero-crossings, peaks, troughs, etc.

The control and processing means may also comprise classification means to identify classes of object near to the sensor by pattern matching with the reflected signals. Thus, the distance and angular position of each object from which signals are reflected may be used to identify the positions of a plurality of those objects in two or three dimensions. Thereafter, the positions of said plurality of said objects may be combined to form an image of the contents of the space near or in front of the sensor.

In embodiments of this aspect, the control and processing means may comprise or may be connected to further processing means in which successive such images or the signals from which they were generated are used in a synthetic aperture or inverse synthetic aperture process to further detail the image of the contents of the space near or in front of the sensor.

When two objects occur at substantially the same range from the apparatus, a single angular position may be derived corresponding substantially to the mean of the positions of the objects weighted by the amplitudes of said reflections of said pulses.

In a related aspect, an exemplary embodiment provides apparatus for obtaining positional information relating to one (or more) object(s), the apparatus comprising:

an array including a transmitting element and a receiving element (preferably a plurality of spaced receiving elements);

signal generating means for applying (operable to apply) a series of pulses to the transmitting element to cause it to transmit a signal, such that at least a portion of the signal can be reflected from the object to be received by the receiving element;

detection means for detecting (operable to detect) a signal reflected to the receiving element (during a detection aperture period) and for generating (operable to generate) an output signal representative of the received signal; and timing means for operating the detection means at a varying delay.

The timing means may be adapted or operable to initiate operation of the detection means after a variable interval following each operation of the signal generating means, the said interval varying with successive pulses.

If a plurality of receiving elements is provided, the computation means may be adapted or operable to process signals detected by the detection means, assess the time interval between a single reflected signal arriving at two or more of the receiving elements, and thereby determine the position of the object from which the signals were reflected.

In a further related aspect, an exemplary embodiment also provides apparatus for obtaining positional information relating to an object, the apparatus being operative in an operating cycle having m steps in which n=1 . . . m, the apparatus comprising:

a signal generating stage for generating a signal at a given timing relationship with respect to a transmitting trigger instant $t_n$;

a transmitting element to transmit the said signal into a detection field; and a receiving element for receiving at least a portion of the signal reflected from the object at a given timing relationship with respect to a receiving trigger instant $r_n$;

wherein the interval $r_n-t_n$ varies as a function of n.

An exemplary embodiment may also extend to apparatus for obtaining positional information relating to one or more objects, the apparatus comprising:

an array including a transmitting element and a plurality of spaced receiving elements;

signal generating means operative to apply a series of pulses to the transmitting element to cause it to transmit a signal, such that a portion of the signal can be reflected from one or more objects to be received by the receiving elements;

detection means operative to detect signals reflected to the receiving elements during a detection aperture period and to generate an output signal representative of the received signals;

timing means operative to initiate operation of the detection means after a variable interval following each operation of the signal generating means, the said interval varying with successive pulses;

computation means operative to process signals detected by the detection means, assess the time interval between a single reflected signal arriving at two or more of the receiving elements, and thereby determine the position of the object from which the signals were reflected.

An exemplary embodiment may further extend to apparatus for obtaining positional information relating to one or more objects, the apparatus being operative in an operating cycle for each of m steps in which n=1, 2 . . . m, the apparatus including:

a signal generating stage operative, simultaneously with or at a fixed time after a transmitting trigger instant $t_n$ to generate a signal, and a transmitting element to transmit the said signal into a detection field;

plurality of spaced receiving elements operative simultaneously with or at a fixed time after a receiving trigger instant $r_n$, to receive a portion of the signal reflected from one or more objects in the detection field, the interval $r_n-t_n$ varying as a function of n and having a magnitude in a range corresponding to the times of travel of a signal reflected from an object within the detection field;

means for identifying the values of n at which signals reflected from one object received at two or more receiving elements and thereby assessing the time taken, and therefore the distance travelled, by the signals from the transmitting element to the various receiving elements; and means for calculating the position of the object from the various path lengths thereby identified.

An exemplary embodiment additionally provides apparatus for generating an image of objects within or through a solid object in accordance with any of the preceding aspects. In such cases, the solid object is a typically a wall.

An exemplary embodiment further provides apparatus in accordance with any of the preceding aspects of the exemplary embodiment for providing an image of an environment in conditions that human vision is compromised. For example, in such embodiments, vision may be compromised by the physiological condition of a user. Alternatively or additionally, vision might be compromised by environmental conditions.

In addition to all of the above, an exemplary embodiment provides apparatus for obtaining positional information relating to an object, comprising: transmitting means for transmitting a probe signal towards the object, the transmitting means comprising: a signal generating stage; and at least one transmitting element; receiving means for receiving, at a plurality of spaced apart locations, the probe signal as returned by the object, the receiving means comprising; at least one receiving element at the plurality of spaced apart locations; and detecting means for detecting the relative timing of the returned probe signals as received at the plurality of locations, the detecting means comprising; a detection stage, coupled to the receiving means; whereby positional information for the object can be determined from the relative timing; and wherein: the signal generating stage applies a series of m pulses to the transmitting element to cause it to transmit a signal, at times $t_n$ where n=1, 2 . . . m, such that at least a portion of the signal can be reflected from the object to be received by the receiving elements; the detection stage detects a signal reflected to the receiving elements at times $r_n$ and generates an output signal representative of the received signal; and wherein the value of $r_n-t_n$ varies as some function of n.

An exemplary embodiment provides apparatus for obtaining positional information relating to an object, comprising: means for transmitting a probe signal towards the object, said transmitting means comprising a transmitting element; means for receiving, at a plurality of spaced apart locations, the probe signal as returned by the object, said receiving means comprising a plurality of receiving elements; and detecting means, coupled to the receiving means, for detecting the relative timing of the returned probe signals as received at the plurality of spaced apart locations; whereby the positional information for the object can be determined from said relative timing; and wherein the transmitting element and receiving elements are disposed on a common substrate.

And it provides an antenna array optionally for use in apparatus for obtaining positional information relating to an object embodying one or more aspects, the array including a transmitting element and a plurality of receiving elements, the transmitting and receiving elements being disposed on a common substrate.

An exemplary embodiment further provides a method of obtaining positional information relating to an object, comprising the steps of: transmitting a probe signal towards the object; receiving, at a plurality of spaced apart locations, the probe signal as returned by the object; detecting the relative timing of the returned probe signals as received at the plurality of locations; and determining positional information for the object from the relative timing; wherein: the transmitting step comprises applying a series of m pulses to a transmitting element to cause it to transmit a signal, at times $t_n$ where n=1, 2 . . . m, such that at least a portion of the signal can be reflected from the object to be received at the plurality of spaced apart locations; the detecting step comprises detecting a signal reflected to the receiving elements at times $r_n$ and generating an output signal representative of the received signal; and wherein the value of $r_n-t_n$ varies as some function of n.

An exemplary embodiment also provides a method of obtaining positional information relating to an object using an apparatus comprising a transmitting element, a receiving means comprising a plurality of receiving elements and a detecting means, the method comprising: transmitting a probe signal from the transmitting element towards the object; receiving, at a plurality of spaced apart locations, the probe signal as returned by the object; and detecting, at the detecting means, the relative timing of the returned probe signals as received at the plurality of spaced apart locations; determining the positional information for the object from said relative timing; wherein the detecting means is coupled to the receiving means and the transmitting element and receiving elements are disposed on a common substrate.

An exemplary embodiment further provides the use of an electromagnetic antenna array in a method described above in which the receiving elements are spaced apart by a distance that is the same order of magnitude as the wavelength λ of the radiation that it is intended to transmit and receive, the electromagnetic antenna array including at least three receiving elements arranged non-collinearly such that there is an axis about which the array is asymmetrical.

An exemplary embodiment also provides the use of an electromagnetic antenna array in a method of obtaining positional information relating to an object, the array including a transmitting element and at least three receiving elements arranged non-collinearly, the transmitting and receiving elements being disposed on a common substrate.

An exemplary embodiment further provides the use of an electromagnetic antenna array in a method of obtaining positional information relating to an object, the array including at least three receiving elements arranged non-collinearly such that there is an axis about which the array is asymmetrical.

An exemplary embodiment provides for a vehicle substantially as herein described and with reference to the accompanying drawings.

Additionally, an exemplary embodiment provides a control system for air bags in a motor road vehicle substantially as herein described and with reference to the accompanying drawings.

An exemplary embodiment also provides for apparatus for a land vehicle substantially as herein described and with reference to the accompanying drawings.

An exemplary embodiment provides for a device for obtaining information about objects within or through a wall substantially as herein described and with reference to the accompanying drawings.

An exemplary embodiment also provides for a hand-held tool substantially as herein described and with reference to the accompanying drawings.

There is also provided an electromagnetic microwave antenna array substantially as herein described and with reference to the accompanying drawings.

There is also provided apparatus for generating an image of objects within or through a solid object substantially as herein described and with reference to the accompanying drawings.

There is also provided apparatus, optionally for use on a (for example, land) vehicle, for obtaining positional information relating to an object substantially as herein described with reference to the accompanying drawings.

There is also provided a method for controlling deployment of air bags in a vehicle substantially as herein described.

Features of any aspect of an exemplary embodiment may be combined with or interchanged with features of any other aspect as desired. Method features may be applied to apparatus aspects and vice versa. Features which are provided independently may be provided dependently, and vice versa.

Although the embodiments of an exemplary embodiment that will be described below operate by radiating ultra-high-frequency, microwave or millimeter wave radiation, in principle a range of other types of signals could be used in alternative embodiments. For example, embodiments could be constructed which operate in other parts of the RF spectrum, they could use light, or they could use sound waves such as ultrasound.

BRIEF SUMMARY OF THE DRAWINGS

Preferred features of exemplary embodiments will now be described in detail, purely by way of example, and with reference to the accompanying drawings, in which.

DETAILED DESCRIPTION OF EXEMPLARY NON-LIMITING EMBODIMENTS

Figure 1:
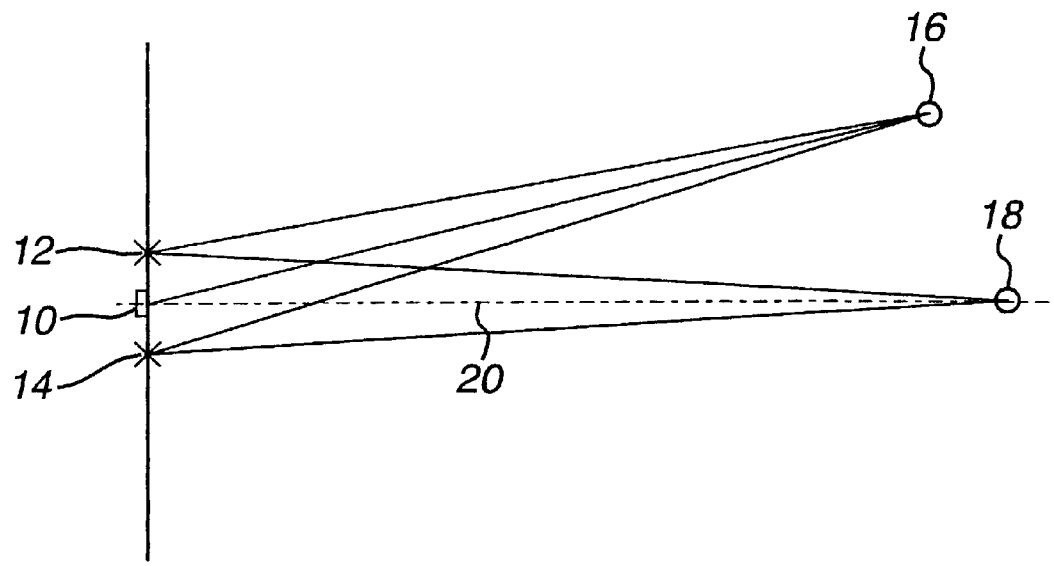
FIG. 1 is a diagram showing the path of signals from a transmitting element to receiving elements of an exemplary embodiment.

With reference first to FIG. 1, an exemplary embodiment of the present apparatus includes a transmitting element 10 located on an axis 20. In this simplified diagram, just two receiving elements 12,14 are shown, located equidistantly on opposite sides of the axis 20. The transmitting element 10 and the receiving elements 12, 14 are located on a common plane disposed normally to the axis 20.

Radiation is emitted from the transmitting element 10 in a broad spread into a detection field of the apparatus. A portion of the radiation strikes and is reflected or scattered from first and second objects 16,18 in the detection field.

The first object 16, in this example, is located on the axis 20. A portion of the radiation emitted from the transmitting element 10 travels along the axis 20 and strikes the first object 18. Some of this radiation is reflected back to strike the receiving elements 12,14. The total distance travelled by the radiation from the transmitting element 10 to each of the receiving elements 12,14 is equal. As a consequence, the reflected radiation is received by the two receiving elements 12,14 simultaneously. Provided that the speed of propagation of the radiation is known, and the round-trip time can be measured sufficiently accurately, the distance from the elements 10,12,14 to the first object 14 can be determined.

The second object 16 is located away from the axis 20. As before, a portion of the radiation emitted by the transmitting element 10 strikes the object 16, and some is reflected back to each of the receiving elements 12,14. However, the length of the path followed by the radiation is less in the case of radiation that strikes the first receiving element 12 than it is for radiation that strikes the second receiving element 14. This means that there is a delay between detection events in the first and second receiving elements 12,14. The length of each of the two reflected radiation paths can be determined directly from the total round trip time for the radiation. Once the difference between the lengths of the paths is known, it is a straightforward problem in trigonometry to calculate the angular position of the second object 16.

Figure 2:
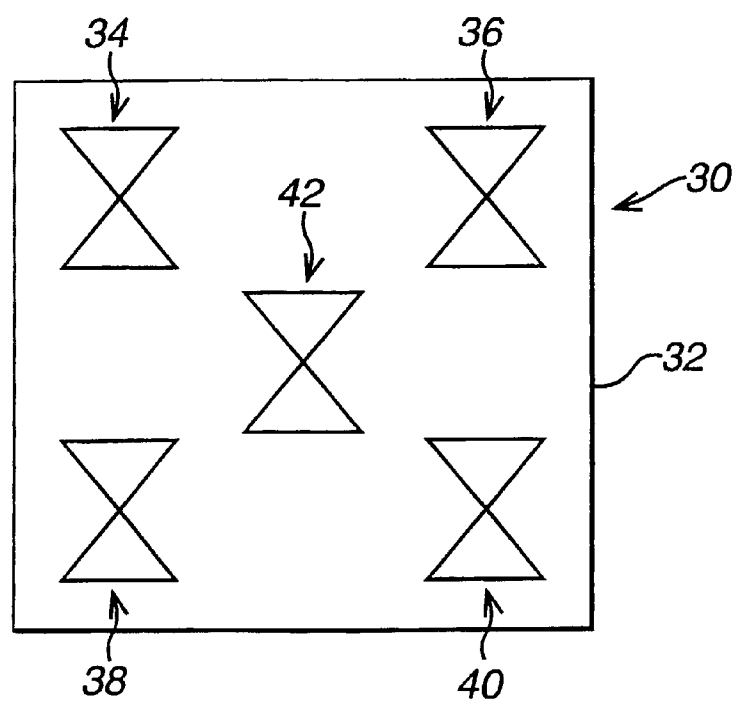
FIG. 2 is a representation of an antenna array of transmitting and receiving elements being a component of an exemplary embodiment.

FIG. 1 shows only two receiving elements 12,14 arranged in a line with the transmitting element 10. This is sufficient to determine the position of an object in two dimensions. The principle can be extended to three dimensions through use of one or more additional receiving elements. FIG. 2 shows one possible arrangement of a transmitting element and receiving elements, as is used in the embodiment that will now be described.

Antenna Array

With reference to FIG. 2, there is shown a diagrammatic representation of an antenna array 30 suitable for use in an exemplary embodiment.

In this embodiment, the radiation generated by the apparatus is constituted by RF signals in the microwave band, and the antenna array 30 is constructed accordingly.

The antenna array 30 is constructed on a substrate 32. In this case, the substrate is a block of plastic or glass-fibre composite material having a flat supporting surface. In order that embodiments are available for use where space is restricted, the antenna array is compact, having a peripheral size of approximately 10×12 cm. Antenna elements are formed on the supporting surface of the substrate as conductors printed onto the surface. The antenna elements may be dipoles (for example, bow-tie dipoles), TEM horns, microstrip patches, stacked patches, or any other compact element or conductive structure suitable for operating at the required signal frequency.

In this embodiment, the array 30 has five antenna elements in total. Four of these elements are first, second, third and fourth receiving elements 34,36,40,38 although other numbers of receiving elements, such as two, three, four or more, may be provided. The fifth element is a transmitting element 42. The receiving elements 34,36,38,40 are disposed at the vertices of a trapezium-shaped (which may, in a special case be rectangular) locus, and with more elements these could be disposed at the vertices say of a trapezoid or cuboid. The transmitting element 42 is disposed at the centre of the same locus.

For many applications, the size of the antenna array must be kept to a minimum. For example, the spacing between the elements may be in the order of no more than a few centimeters, say between 1 and 10 cm, preferably between 3 and 8 cm. A hypothetical axis corresponding to the axis 20 discussed with reference to FIG. 1 can be considered to extend normal from the supporting surface through the centre of the transmitting element 42. For reference below, the spacing between the first and second receiving element will be denoted $D_{12}$, the spacing between the second and third receiving element as $D_{23}$, and so forth.

As a specific example, if the apparatus is designed for operation with signals of frequency in the region of 6.5 GHz, the antenna elements may be dipoles of approximately 18 mm in length, and may be fed with a balanced line feed.

In an alternative form of construction, the antenna elements may be located within a dielectric radome. Associated signal processing circuitry may also be located within the radome in order to provide the apparatus as a self-contained package.

Figure 3:
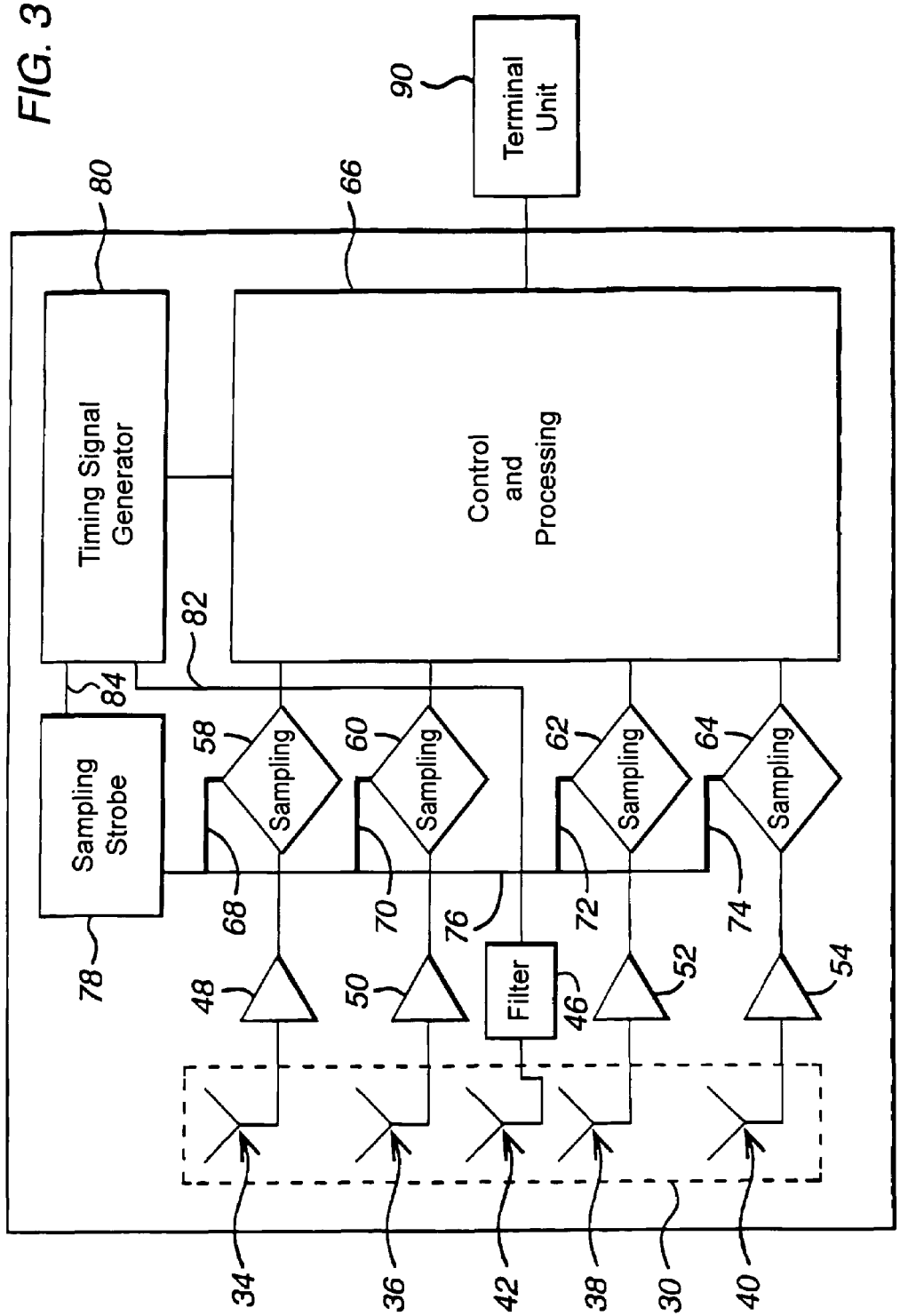
FIG. 3 is a representation of the main circuit elements of an exemplary embodiment.

Turning now to FIG. 3, the circuit elements of the exemplary embodiment will now be described.

The apparatus includes a control and processing stage 66 that controls the operation of other components of the apparatus. The control and processing stage 66 has a data output that sends data relating to the position of one or more objects located within the detection field of the apparatus. Such data may be received by a terminal unit 90, possibly including an alarm, for further processing, for display to a user, and/or for transmission to a remote system, as required in any particular application.

A pulse generator and filter stage 46 is connected to the transmitting element 42 of the array 30. The pulse generator may, for example, be implemented using step-recovery diodes ("SRDs"), GaAs FETs, or SiGe transistors, the aim being to produce a sharp pulse waveform, which is then filtered on transmission to generate the transmitted signal. Preferably, the rise and fall time of the waveform is in the order of less than 0.5 ns. Each of the receiving elements 34,36,38,40 of the array 30 is connected to a respective filtering and amplifying stage 48,50,52,54. The received signal is filtered to generate the output signal. Each of the filtering stages 46; 48,50,52,54 includes a bandpass filter in the signal path from the transmitter to the transmitting element 42 and from the receiving elements 34,36,38,40 to the receiver circuitry. Filtering is a standard technique used to ensure that the generated signal is suitable for the antennas, and for compliance with regulatory requirements.

Sampling Circuitry and Delay Lines

Signals from each of the filtering and amplifying stages 48,50,52,54 are fed to a signal input of a respective switched sampling stage 58,60,62,64. The output of each switched sampling stage 58,60,62,64 is connected to a respective input of the control and processing stage 66. Each switched sampling stage 58,60,62,64 has a gate input, which, when activated by a suitable signal, passes signals on the input line onto the output line. Each of the gate inputs is connected through a respective delay line 68,70,72,74 to a common strobe line 76. The strobe line 76 is fed with signals from a sampling strobe signal generation stage 78. Each of the delay lines 68,70,72,74 imposes a delay as near as possible identical to each other on signals. The delay lines 68,70,72, 74 may be constructed as lumped capacitors and inductors, but more preferably are equal lengths of printed transmission line of length Ld. This delay will be referred to as td, and will be discussed further below.

A timing signal generator 80 of the apparatus has two output lines 82,84. A first of the output lines 82 is connected to a control input of the pulse generator and filter stage 46. A second of the output lines 84 is connected to a control input of the sampling strobe signal generation stage 78. A control input of the timing signal generator 80 receives signals from the control and processing stage 66. The timing signal generator 80 operates to generate pulses at both the transmitter trigger instants and the receiver trigger instants.

In this embodiment, the timing signal generator 80 includes an oscillator and logic components. The oscillator includes a crystal-controlled clock, an output of which is fed to the logic components. Upon initiation of a timing cycle, the logic components use the signals received from the clock to generate a linear ramp signal. The linear ramp signal is fed to one input of a fast comparator, the other input of which is fed with an external voltage source. The comparator has an output upon which a signal is generated that is indicative of the relative magnitudes of the signals on its two inputs. Thus, the signal on the output changes its state after the initiation of a ramp cycle at a time interval which is dependent upon the external voltage. The timing signal generator 80 stage is configured to generate a signal on its first output line upon initiation of the timing cycle, thereby creating a transmitter trigger instant, and on its second output line upon the change of state of the comparator output thereby creating a receiver trigger instant.

Alternatively, two comparators may be provided, each of which has one input connected to a different external voltage source, and the other input connected to the ramp signal. The first comparator generates an output signal when the ramp exceeds a first voltage, thereby creating a transmitter trigger instant, and the second comparator generates an output signal when the ramp exceeds a second voltage, thereby creating a receiver trigger instant. In this way, even if the ramp signal drifts up or down, the interval between the transmitter trigger instant and the receiver trigger instant will remain constant.

In an alternative embodiment, the timing signal generator includes first and second crystal-controlled clocks, the second operating at a frequency slightly below that of the first. Thus, there is a slow variation in phase between the two clocks, whereby a slowly varying time delay can be generated.

Either of the two above-described embodiments (more straightforwardly in the case of the former) permit and allow random or quasi-random variation in the timing of the transmitter and receiver trigger instants. This may be achieved, for example, by phase modulation of the timing signals, level shifting of the ramp, time modulation of initiation of the timing cycle or random signal inversion.

In alternative embodiments, the switch circuits may operate independently or be triggered in common. During post-processing of the signals, symmetrical leakage signals between the transmitting element 42 and the receiving elements 34,36,38,40 can be used to correct for any differences between the timing of the various switched sampling stages 58,60,62,64.

A most important consideration in the design of the timing and sampling stages is that inter-channel timing errors are minimised so that an accurate comparison can be made of the times at which signals are received by the various channels.

The filter stage 46 is designed to ensure that the signal fed to the transmitting element 42 causes signals to be radiated that meet appropriate regulatory requirements, for example, in respect of their power and/or frequency, and to ensure that the signals are unlikely to interfere with nearby equipment such as communication or sensing devices. The filter stage 46 may be implemented using a known broadband amplifier, associated with microstrip or lumped-element filters, selected to pass signals of frequency in the operating range of the device.

The switched sampling stages may suitably be implemented using switching diodes such as Schottky diodes. These may be configured in, for example, a bridge arrangement well-known to those skilled in the technical field, and are configured to be triggered by pulses generated by the timing signal generator 80.

The control and processing stage 66 is constructed in accordance with the specific requirements of the particular application in which an exemplary embodiment is to be used.

Sequence of Operation

Figure 5:
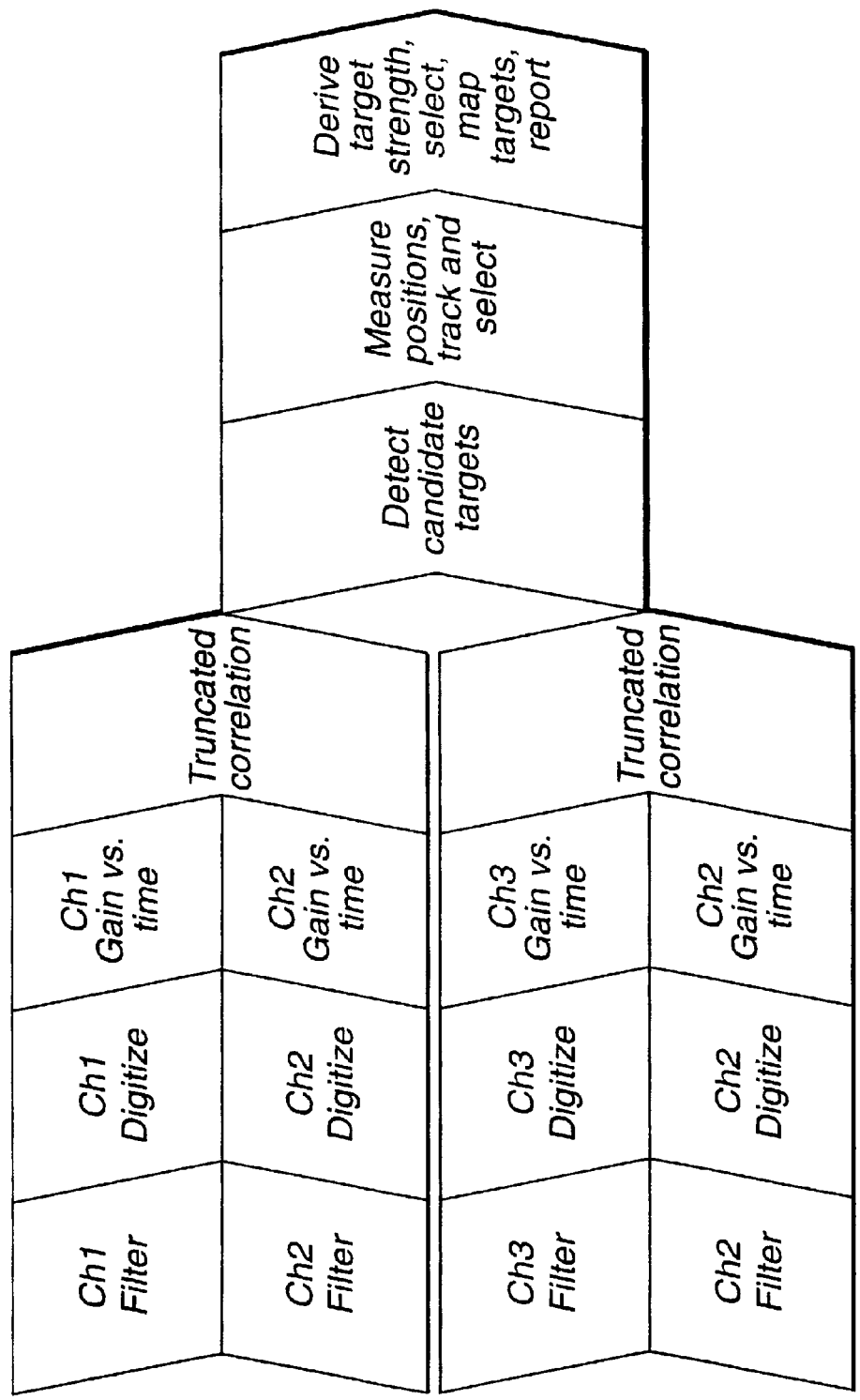
FIG. 5 is a flow diagram of the processing steps carried out by an exemplary embodiment of the present apparatus.

A flow diagram of the processing steps carried out by an exemplary embodiment of the present apparatus is shown in FIG. 5. This illustrates the manner in which signals from four receiving elements are filtered, digitised, and amplified. Then, pairs of signals are combined in a truncated cross-correlation process, to provide a single output signal. This signal is then processed as required by any particular application. Such processing might include target detection, measurement and tracking, and selection, before finally generating a report.

The sequence of operation of a preferred embodiment will now be described.

When a scanning sequence is to be initiated, the control and processing stage 66 applies an enabling signal to the control input of the timing signal generator 80. The timing signal generator 80 then generates a train of pulses on both of its output lines 82,84. On the first output line, the pulses occur at times which will be designated as $t_1$, $t_2$, $t_3$, and so on. The pulses on the first output line 82 trigger the pulse generator and filter stage 46, and consequently cause a signal to be emitted by the transmitting element 42. These times $t_1$, $t_2$, $t_3$, . . . will therefore be referred to as "transmitting trigger instants". The transmitting trigger instants can be generated at regular intervals, but this is not a requirement. Some other pre-determined pattern of intervals may be used, or they may even be generated randomly. However, in this example, it should be assumed that the separation between the transmitting trigger instants is an approximately constant time t. The time at which each of the transmitter trigger instants is generated is determined by programming of the control and processing stage 66.

On the second output line 84, the pulses trigger the sampling strobe signal generation stage 78. The time of occurrence of pulses on the second output line 84 will therefore be referred to as "receiving trigger instants". In the preferred embodiment, there is a corresponding receiving trigger instant for each transmitting trigger instant, although in other embodiments there may be a plurality of receiving trigger instants for each transmitting trigger instant, typically each at a different delay.

The receiving trigger instants occur in a sequence which will be represented as $r_1$, $r_2$, $r_3$, where $r_1 = t_1 + T_0 + T$, $r_2 = t_2 + T_0 + 2T$, $r_3 = t_3 + T_0 + 3T$ and so forth. In the above, in this embodiment, $T_0$ is a constant which may be greater than or less than or equal to 0 and T is a non-zero constant.

In this embodiment, T is a constant greater than 0. However, T may be chosen to be less than or equal to 0, whereby at least one receiving trigger instant occurs before or simultaneously with a first transmitting trigger instant. Signals received from the receiving elements 34,36,38,40 during this receiving trigger instant can be analysed to obtain a sample of noise prior to transmission. Also, signals derived from a simultaneous receiving and transmitting trigger instant can be analysed to obtain a sample of transmission leakage between the transmitting element 42 and the receiving elements 34,36,38,40. The results of these analyses can be used to facilitate analysis of signals received during subsequent operation of the apparatus.

In alternative embodiments, the values of T may be chosen to follow a predetermined but discontinuous or partially continuous sequence.

In cases where T>0, as the sequence continues, each receiving trigger instant occurs at an increasing time after the corresponding transmitting trigger instant. That is to say, as n increases the value of $r_n - t_n$ also increases. The sequence continues until the value of $r_n - t_n$ reaches a predetermined maximum (typically in the order of several or several tens of nanoseconds). The maximum time corresponds to the longest expected round-trip time for a signal emitted by the transmitting element 42 to be reflected from an object in the field of detection of the apparatus, and received by the receiving elements 34,36,38,40, a time governed by the maximum range of operation of the apparatus.

In an alternative embodiment, the value of $T_0$ is comparatively large and positive, and the value of T is negative. In such embodiments, the value of $r_n - t_n$ starts at a maximum when n=0, and decreases as n increases.

At a fixed time interval after each transmitting trigger instant, the pulse generator and filter stage 46 generates a transmitting signal. The signal is filtered to meet the appropriate regulatory standards, and is then passed to the transmitting element 42 from which it is radiated into the field of detection of the apparatus. In this embodiment, the emitted signal may have a frequency of 2.45 GHz or 6.5 GHz, which is made available by European and US regulatory authorities for applications such as this.

At a fixed time after each receiving trigger instant, the sampling strobe signal generation stage 78 generates a pulse. This pulse is passed to the gate input of each of the switched sampling stages 58,60,62,64 through the respective delay line 68,70,72,74. The effect of this pulse arriving at the gate inputs is to close simultaneously each of the switch sampling stages 58,60,62,64 for an aperture time ta, during which the signals on the input of each is passed to its output. During the aperture time ta, the signals received from receiving elements 34,36,38,40 and processed by the filtering and amplifying stages 48,50,52,54 are conveyed to the control and processing stage 66.

Avoidance of Crosstalk Between Samplers

It is likely that there will be some signal leakage from the input of the switched sampling stages 58,60,62,64 to their gate inputs. The purpose of the delay lines 68,70,72,74 is to avoid this resulting in crosstalk between signals from the various receiving elements. It will be seen that the minimum time taken for a signal to pass from one switched sampling stage 58,60,62,64 to another is not less than 2td (since the signal must pass through two of the delay lines). The value of td is therefore chosen such that ta<2td (and more preferably ta<td) whereby no signal can propagate from one switched sampling stage to another within the aperture time ta.

This arrangement permits the switched sampling stages 58,60,62,64 to be triggered from a common signal. This is in contrast to a more conventional arrangement in which a separate strobe pulse generator is used to generate a signal for each individual switched sampling stage; a more complex and costly arrangement that can lead to uncertainty in the relative timing between triggering of the various switched sampling stages 58,60,62,64.

In embodiments in which the delay lines are constituted as printed transmission lines, the value of Ld (as defined above) is given by the formula $$Ld > Vl.ta/2$$

where Vl is the speed of propagation of signals in the transmission line. For example, if the value of ta is in the order of 50 ps, the value of Ld may be in the region of 10 mm.

Calculation of Object Ranges

As will be understood, when a signal is conveyed to the control and processing stage at a receiving trigger instant n, it is known that the signal had a round-trip time from the transmitting element 42 to the receiving element in a time of $T_0+nT+C$. In this expression, C is a constant that represents relative total delay between the transmitting trigger instants and the start of the transmission, and the receiving trigger instants and the start of the receiving aperture time. The distance of the object from which the signal is reflected is therefore given by $c(T_0+nT+C)/2$. As will become apparent in due course, it is important to note that the distance of the object can be calculated by a formula that does not depend on t, nor does it depend upon the absolute value of $t_n$.

As a particular example, for a device operating at or around 6 GHz, T may be approximately 160 ps and ta may be approximately 50–80 ps.

Calculation of Angle to Object—Azimuth and Elevation

As was discussed with reference to FIG. 1, a proportion of the energy emitted by the transmitting element 42 at each transmitting trigger instant is reflected back towards the apparatus and is received by the receiving elements 34,36, 38,40. In this embodiment, the receiving elements 34,36,38, 40 are arranged in a two-dimensional array. Consequently, the reflected energy arrives at the receiving elements 34,36, 38,40 at different times dependent upon the object's three-dimensional location with respect to the apparatus.

Assume now that there is an object located at a distance R5 from the transmitting element and at distances R1, R2, R3 and R4 from the receiving elements 34,36,40 and 38 respectively.

If an object is located on the axis of the array 30 (sometimes referred to as "the boresight"), it is equidistant from all four receiving elements 34,36,38,40, with the result that it will arrive at all four receiving elements 34,36,38,40 simultaneously.

On the other hand, if the object is located off-axis, for example at a location with elevation azimuth $\phi$ and elevation $\theta$, there will be a time difference of approximately Dv sin $\theta$/c between the signals arriving at vertically spaced receiving elements of the array 30 and a time difference of approximately Dh sin $\phi$/c between the signals arriving at horizontally spaced receiving elements of the array 30 where Dv and Dh are, respectively, the vertical and horizontal distance between receiving elements in the array 30. In the above, c is the speed of light.

More specifically, the times at which the reflected signals will be received by the receiving elements are times Tr1, Tr2, Tr3, Tr4, respectively:

$$Tr1 = (2\ R5 + (-D14\ \sin(\theta) + D12\ \sin(\phi))/2)/c$$

$$Tr2 = (2\ R5 + (-D23\ \sin(\theta) - D12\ \sin(\phi))/2)/c$$

$$Tr3 = (2\ R5 + (D23\ \sin(\theta) - D34\ \sin(\phi))/2)/c$$

$$Tr4 = (2\ R5 + (D14\ \sin(\theta) + D34\ \sin(\phi))/2)/c$$

where R5 is the distance between the transmitting element 42 of the array 30 and the object from which the received signals have been reflected, these equations being approximations for small angles.

The above equations can be solved to obtain the angles $\theta$ and $\phi$.

It will be observed that there is some redundancy in the information received from an array 30 of four or more elements. This may be dealt with by selection or by an averaging or a weighting process.

A Cartesian coordinate (X, Y, Z) can then be calculated. If R is the range to the object (calculated by multiplying the total round trip time for a reflected signal by the speed of light) then:

$$X = R\ \cos\theta\ \sin\phi$$

$$Y = R\ \cos\theta\ \cos\phi$$

$$Z = R\ \sin\theta$$

In order to determine the arrival time of the reflected signals, the control and processing stage analyses signals appearing from the switched sampling stages 58,60,62,64, as will now be discussed.

In general, the distance D is small in comparison with the distance between the array 30 and the object from which the signals have been reflected. Thus, the assumption is made that the reflected signal comprises principally plane waves, and that the signal does not change significantly between one receiving element and another. It is also assumed that each of the receiving elements 34,36,38,40 will react substantially identically to the signal. Moreover, each receiving element has a small angular resolution with respect to the object.

Time Scale Stretching

Referring again to FIG. 3, each of the switched sampling stages 58, 60, 62, 64 is activated at a time $r_n = t_n + T_0 + nT$, for n=1, 2, ... m. When a sampling stage is activated, it samples the input waveform and holds that value until the next receiving trigger instant $r_{n+1}$. As described above, the value of $r_n - t_n$ is arranged to increase (or decrease) as a function of n. It therefore takes t/T repetitions to complete the waveform, where t is the mean separation between the transmitter trigger instants.

Assuming that the reflected signal is essentially unchanged between trigger instants (such as is the case if the object does not move significantly relative to the transmitting and receiving elements), then a strobe effect takes place which results in the detected signal being stretched by a factor of t/T. In this way the output of the sampling stages is of duration greater than that of the received signals by a factor t/T and of frequency less than that of the received signals by a factor t/T.

The last-described arrangement stretches the received signal in time without changing the signal shape. This is beneficial because it reduces by a factor of t/T the frequency at which the processing stage 66 operates. The value of t/T may be considered as a constant divisor of frequency and multiple of time.

In the particular case where t=T, the output of the switched sampling stages 58, 60, 62, 64 would be at the same frequency as the input signal. However, if t≠T, then the output of the switched sampling stages 58, 60, 62, 64 would be at a frequency that is reduced by a factor of t/ T. For example, if t=100 ns and T=1 ps then the factor t/T will be $10^5$. For an incoming signal frequency of 5 GHz at the receiving elements, the output of the switched sampling stages 58, 60, 62, 64 will be a signal of 50 kHz.

Under the transformation described above, the shape of the received signals is preserved in the time domain, but their frequency is reduced by a common divisor. The resulting signals may be of a frequency, duration and data rate that can readily be processed by comparatively low-cost hardware.

Frequency stretched signals from the switched sampling stages 58, 60, 62, 64 are converted to digital form before being passed to the control and processing stage 66. The particular processing then carried out on the signals, and the output data generated by the control and processing stage 66, is highly dependent upon the particular application and intended function of any given embodiment.

Determining a Time Interval Using Truncated Cross-Correlation

In this embodiment, the analysis is performed by a modification of a known method of cross-correlation. The analysis is carried out upon signals which are assumed to contain a plurality of cycles with similar, but non-identical, envelope shapes. Conventional cross-correlation methods can give ambiguous results when carried out on signals of this type.

Following on from the assumption described in the last-preceding paragraph, it is possible to determine the time separation of the receiving instants in a process that compares the signals derived from two of the receiving elements 34,36,38,40, and determines the time difference at which these signals appear most similar.

Conventional cross-correlation between two signals includes the step of summing the products of the two signals over a period (the interval of correlation) corresponding to the duration of the waveform contained in the signals. This step is carried out for a series of cases between which one of the signals is shifted in time with respect to the other over a range which, in conventional cross-correlation, is also comparable with the duration of the signal.

For signals that include a plurality of cycles of similar shape, the results produced by conventional cross-correlation can be ambiguous. The method used in the present embodiment (which method will be referred to herein as "truncated cross-correlation") takes advantage of the fact that the maximum time difference between the same reflected signal being received by any two of the receiving elements is the time taken for the signal to propagate the distance between adjacent receiving elements. This can be expressed as a value D/c. In the present embodiment, the range over which one signal is shifted with respect to the other is limited to this value. This results in a signal containing only one or a few peaks, the actual number being determined by the ratio of the element separation (D) to the wavelength (λ) of the transmitted signal. Thus, the method of truncated cross-correlation is optimised by taking into account the geometry of the apparatus, rather than by reference to the signal wavelength.

More specifically, the truncated correlation process is as follows:

Assume that the received signal from element 1 is an amplitude modulated wave $V_1=V_0.P(t)_1$ and that the received signal from an element 2 is an amplitude modulated wave $V_2=V_0.P(t)_2$.

P(t) is substantially non-zero for a time period $-t_p$ to $t_p$ for both waveforms.

Internally within a data processing system, each of the waveforms is represented by a series of numbers X(n) and Y(n) that represent, respectively, the values of $V_1$ and $V_2$ at time t(n) where $t(n)=t_0+ndt$ and $dt=A\lambda/kc$, and where A is a constant which depends on the amount by which the signal has been stretched (typically A=t/T)

c is the speed of light, and k is an integer between 2 and (for example) 20 representing the number of digital samples per wavelength.

The truncated correlation function is:

$$C(m) = \sum_{nmin}^{nmax} (X(n) \cdot Y(n+m))$$

for values of m from $-kD/\lambda$ to $kD/\lambda$, where:

m is the shifting index, which is an integer between $-kD/\lambda$ and $kD/\lambda$, representing the index of truncated correlation, and nmax and nmin define the interval of the correlation, typically a few cycles (say, 2 cycles) of the waveform.

Thus it will be appreciated that in the truncated cross-correlation according to the present embodiment, the range over which one signal is shifted with respect to another is truncated, in comparison to conventional cross-correlation. The range of the shift is related to the separation of the receiving elements. For example, a transmitted pulse may have a length of 2λ whereas the separation between receiving elements may be λ/2. Since it is known that the maximum delay between the two signals is equal to the time it would take the transmitted signal to travel between the two receiving elements, the index of correlation can be limited to a value corresponding to that maximum delay. Thus, the range of shift is not related to the duration of the signals themselves, but rather to the distance between receiving elements.

It will be noted that the interval of correlation is also truncated, in this case being bound by the values nmin and nmax, these values being selected to limit the cross-correlation to the useful part of the waveform.

As will be understood, this correlation takes place in a short space of time in order that the system as a whole can generate images and other data sufficiently quickly. To achieve this, a correlating function such as this can be carried out directly in hardware, for example, by digital signal processors connected to the switched sampling stages through analogue to digital converters. Alternatively, a software program running on suitable hardware, such as a microprocessor, may carry out the correlating function.

Figure 4:
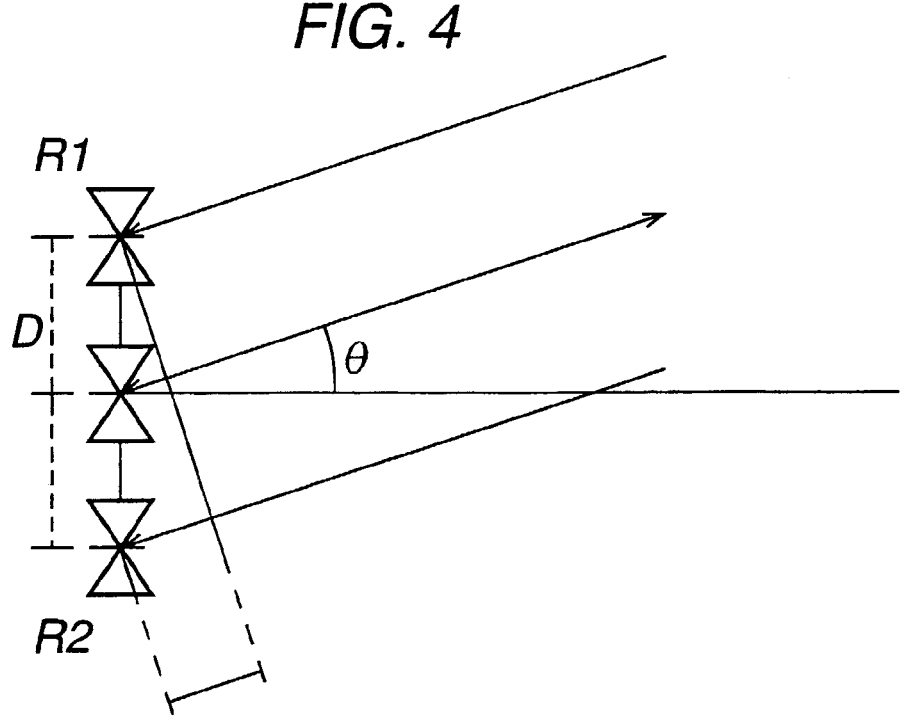
FIG. 4 is a diagram illustrating the process of trilateration.

This truncated cross-correlation of the signals derived from any two of the receiving elements 34,36,38,40 produces a maximum at a value corresponding to the sine of the angle between the axis 20 and a line to the location of the object projected onto the plane in which the receiving elements lie. By performing such correlation with various of the receiving elements in combination, the angular position of the object in three dimensions can be obtained. In the preferred embodiment, the receiving elements have wide beams and little angular resolution, and angular positions are determined by trilateration, that is, by precise path length comparison, as illustrated in FIG. 4, in which path distance D sin θ is shown as a function of offset angle θ and the distance D between the receiving elements R1, R2.

In the light of the above, it will be understood that preferred embodiments may be considered as a "delay monopulse" radar (with delay being measured directly in the correlation procedure).

Enhancing Resolution of the Array

The angular resolution of the array 30 is relatively poor with respect to objects lying close to the plane of the array. Further processing steps may be carried out to improve resolution in this respect. For example, the relative amplitudes of signals received by each of the receiving elements 34,36,38,40 can be compared.

In cases where the array is moving with respect to objects in its field of detection, the time at which reflected pulses are received by the receiving elements will vary from one scan sequence to the next. The changes can be analysed to gain information about the position and motion of the objects. One effect of this is to enhance the ability of the array to resolve closely spaced objects.

As will be understood, the correlation sequence described above will produce a maximum at a delay that corresponds to the interval between the reflected signal being received at the two receiving elements concerned. This delay can be used to determine an angular direction of the object from which the signal was reflected. A combination of the results of the correlation being applied to two or more non-collinear pairs of receiving elements can be used to derive the position of the object in three dimensions using the formulae set forth above.

It is possible to carry out a first, relatively coarse cross-correlation of the signals in order to obtain an approximate value for the angle at which the object is located, and then to carry out a further, relatively finer correlation, using a larger number of samples, around the angle first estimated, and thereby refine the estimate.

Ameliorating the Effect of Grating Lobes

If the separation between receiving elements D is greater than $\lambda/2$ then grating lobes may occur, which may in turn give rise to false maxima. These false maxima can be distinguished by generating a significantly reduced correlation between the channel pairs, thereby reducing the difficulties normally associated with narrow-band arrays. Grating lobes may also be reduced or eliminated by reducing the spacing between the elements to less than one half of the dominant wavelength of the signal (that is, by setting $D<\lambda/2$); however, the cost of this is reduced angular resolution and increased inter-element coupling.

Figure 6:
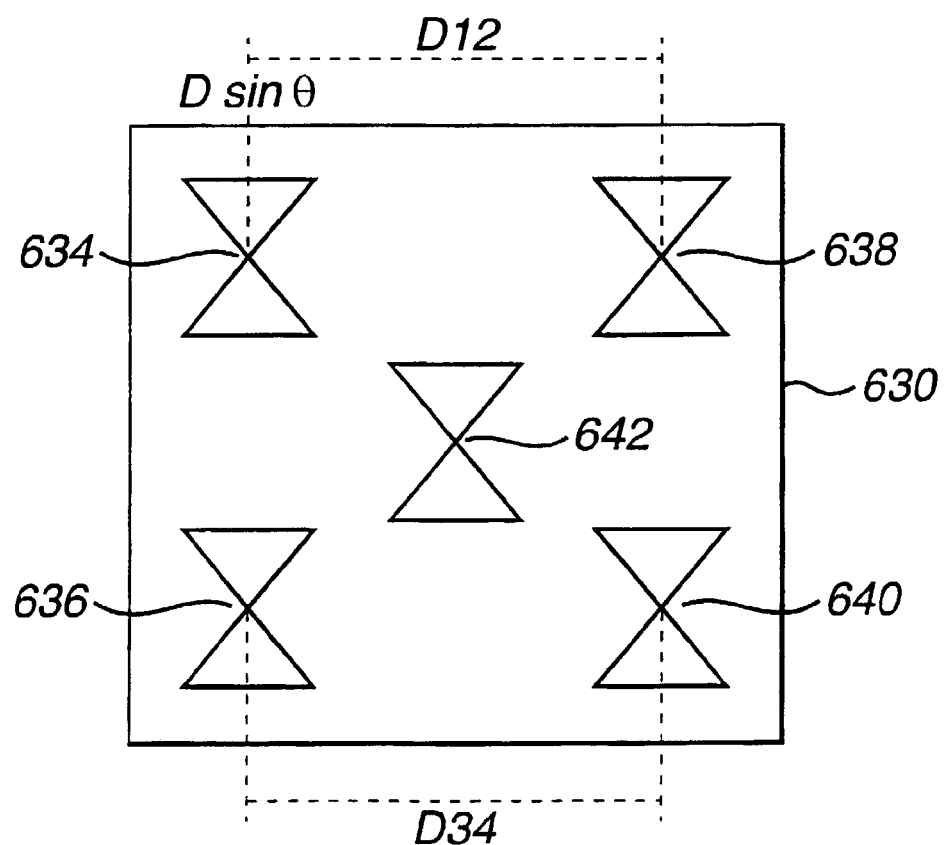
FIG. 6 shows an antenna array for use in an alternative exemplary embodiment.

In preferred embodiments, the occurrence of grating lobes is controlled by using different horizontal separations for two pairs of receiving elements 634, 636, 638, 640 (that is to say, $D_{14} \neq D_{34}$). An array 630 embodying this modification is shown in FIG. 6. In such an array, the position of the principal correlation maximum will be the same for each pair, but the position of the false maxima caused by the grating lobes will differ to an extent dependent upon the difference in spacing between the element pairs.

Figure 7:
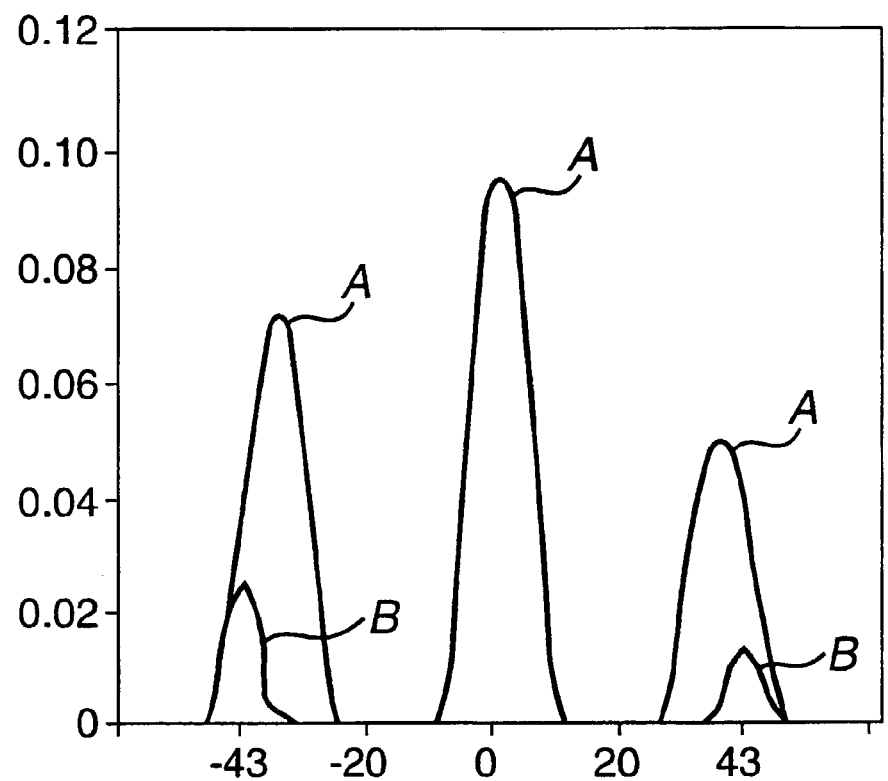
FIG. 7 is a graph illustrating the outputs of the array of FIG. 6.

As a specific example, if $D_{34}=\lambda$ and $D_{12}=3\lambda/4$, the correlation peaks arising from the grating lobes of elements 1 and 2 coincide in angle with the correlation zeros arising from the grating lobes of elements 3 and 4. If the truncated correlation functions of the two pairs of elements are multiplied together, the "true" peaks that arise from the correlation are enhanced, while the peaks that arise from the grating lobes will be greatly reduced in amplitude. A graph illustrating the output of both pairs of elements individually and as combined as described above is shown in FIG. 7. In FIG. 7, trace A shows the angular responses of a pair of receiving elements, while trace B shows the combined response illustrating the result of carrying out the multiplication described above.

As has been discussed above, the value of D may be in the order of $10^{-2}$ m, whereby the value of D/c is in the order of $10^{-10}$ s, mandating a signal frequency in the range of several GHz to achieve satisfactory resolution. While it is possible to carry out signal processing upon signals having a frequency and duration of this order, the apparatus required is considerably more costly than may be the case for apparatus having lower speed capabilities. In many embodiments, cost is of considerable importance. For this reason, a processing step of time scale stretching is used to reduce the frequency requirements of the processing circuitry.

The transmitted signal is of duration such that its length in space is of magnitude similar to that of the objects that it is primarily intended to detect, and also of the same magnitude as the spacing between the receiving elements 34,36, 38,40. A consequence of this is a small likelihood of combined reflections from several objects adding to produce a combined reflected signal. This allows several objects to be resolved within the detection region of the apparatus, provided that these are not located very close together.

For objects that are close to the plane in which the elements are located, the sensitivity of the relative timing of the received signals to small changes in angular position of the object will be relatively poor. In this situation the sensitivities of each receiving element can be made different, allowing further angular discrimination on the basis of the received signal amplitude.

Thresholding and Pattern Matching

In a first example of an enhancement to a system as described above, the control and processing stage is operable to determine the amplitude of the reflection from each object in addition to its position. It may then be operable to determine whether the object is in a position and of a cross-section sufficient (that is in excess of a threshold) to warrant say activating an alarm. In the example of a warning system for a vehicle driver, an alarm may be activated in such circumstances to warn a driver of the proximity of a hazard.

Since the angular position of an object determines the sensitivity of the receiving elements in the direction of that object, determination of the amplitude of reflection typically is made after the angular position of the object has been determined in the cross-correlation procedure described above. Suitable further processing of the received signals may proceed in a process as will now be described. First, the amplitude of the maximum value obtained from the correlation (that is, the value used to calculate the angular position of a detected object) is obtained. The gain of the array, as applicable to signals received from that angular position is then determined, typically from a look-up table stored in memory of the control and processing stage 66, and the amplitude value is divided by the gain to produce an angle-independent amplitude value. The angle-independent amplitude value is then multiplied by a value proportional to the fourth power of the calculated distance of the object (i.e. by a value proportional to $D_{54}$). This resulting value is proportional to the radar cross-section of the object, and will be referred to as the "object amplitude".

In order to decide whether the object detected in the cross-correlation process is sufficiently significant to warrant (say) activating an alarm, in typical embodiments the object amplitude is compared with a threshold, and the activation (or other action) is initiated in the event that the object amplitude exceeds the threshold. In such embodiments, the threshold may be determined by various techniques. In the simplest case, it may be a fixed value. Alternatively, it may be varied in accordance with a variety of rules. As a first example of such a rule, the threshold may be varied as a function of the round-trip time of the signals (effectively, as a function of the range $R_5$). Alternative or additional variation to the threshold may be made as a function of, amongst other possibilities, levels of noise in the received signals, (in appropriate embodiments) the parameters of operation of a vehicle, or an externally applied signal, for example a signal applied by a user control.

Alternatively or additionally, the signals received may be subjected to pattern matching analysis. For example, they may be compared qualitatively to pre-determined signal patterns derived from signals reflected from known classes of object. Such analysis may include comparison of the shape of the received signals with a plurality of prototype signals previously measured and stored in memory accessible by the processing stage, or may include identifying characteristic features of the received signals such as their duration, their amplitude rise and fall times and their frequency spread. In each case, the match found indicates that the signal has been reflected from a particular class target objects. When a match is found, or characteristic features are identified in the received signals, the processing stage may alter the severity of a warning signal, or otherwise modify its output, in response to the class of objects identified. For example, in applications for use on a vehicle, particular priority may be given to signals that are identified as having been reflected from a person or animal in the path of the vehicle.

Warning Zone

The processing steps described above can determine the 3-dimensional position of an object within a detection field of the system. However, further, the detection region can be sub-divided into a first zone in which detection events are considered to be significant, and a second zone in which they are not significant. Effectively, the first zone defines a warning zone of the system. The sub-division can be carried out by the control and processing stage 66, typically by a software program.

The control and processing stage 66 may operate to execute an algorithm that defines a 3-dimensional volume of space within the detection field near to the array 30 as a warning zone. For example, the warning zone may be defined to lie between spaced planes by specifying that it is bounded by minimum and maximum values of X, Y, and Z ordinates in a Cartesian coordinate system within the detection field of the array. Alternatively, the warning zone may have an arbitrary shape, defined by a look-up table or a mathematical formula. Thus, the warning zone can have substantially any shape that can be defined algorithmically, and can have any volume, provided that it is entirely contained within the detection field.

The control and processing stage 66 is operative to issue a warning, for example at least one of an audible, a visual or a tactile warning to a user upon detection of an object in the warning zone.

As a development of this embodiment, the control and processing stage 66 defines a plurality of warning zones. The warning zones may be non-coextensive (overlapping, separated or spatially different) and/or alternatively defined, by which it is meant that different characteristics are used for determining whether an object is in the relevant warning zones. For example, different zones may be provided for detecting different speeds or different sizes of objects. This can, for example, be used to provide warnings of multiple levels of severity, depending upon the position or other characteristics of a detected object.

In another development of this embodiment, the control and processing stage 66 is operative to analyse characteristics of objects outside of the warning zone. Such characteristics may be, for example, size of the object, distance of the object from the apparatus and/or the warning zone, direction of movement of the object relative to the apparatus and/or the warning zone, and relative speed of the object. As an example, the control and processing stage 66 may be operative to track objects outside the warning zone and to predict their entry into the warning zone. The apparatus may be operative to issue a pre-warning based on the analysis.

For example, if the apparatus is mounted on a vehicle (as described below) in order to provide the driver with a parking aid, the apparatus may issue a pre-warning in the way described above if a large object is converging with the vehicle, even though that object may be outside of the warning zone. This may be particularly desirable, for example, if the object itself is heading for the vehicle in the same direction that the vehicle is heading for the object, which may give an increased risk of collision.

An Application to Land Vehicles

Figure 8:
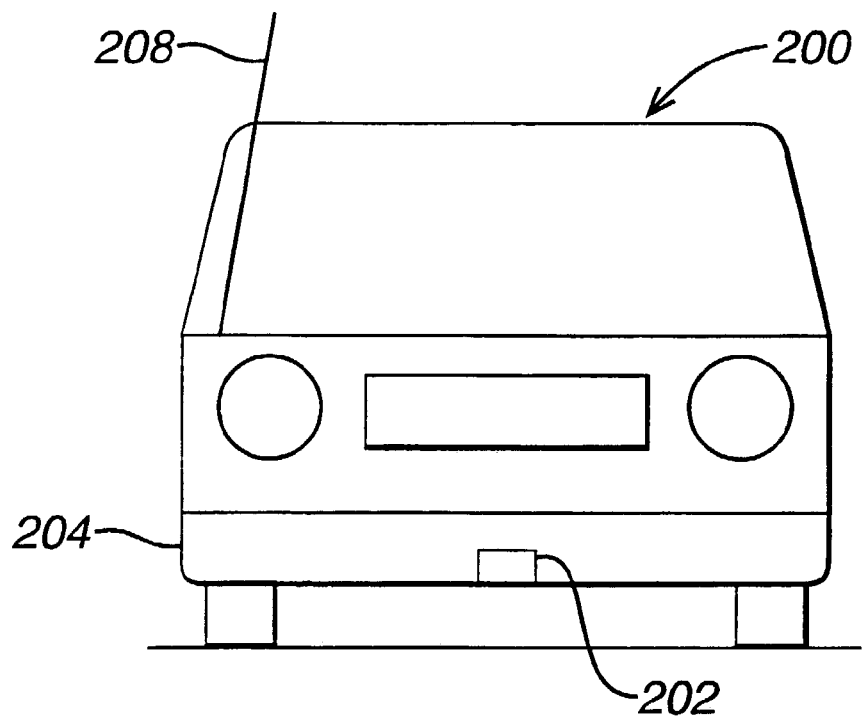
FIG. 8 shows an installation of an exemplary embodiment of the present apparatus in a motor road vehicle.

An exemplary embodiment of the present apparatus can be installed in a motor road vehicle 200, as shown diagrammatically in FIG. 8. In this example, the apparatus is intended to warn a driver of objects or obstructions external of the vehicle. The apparatus includes an array and processing circuitry mounted, as shown at 202 in a single enclosure within a non-metallic front bumper 204 of the vehicle 200. The array and processing circuitry may be as described below with reference to FIG. 12.

Figure 9:
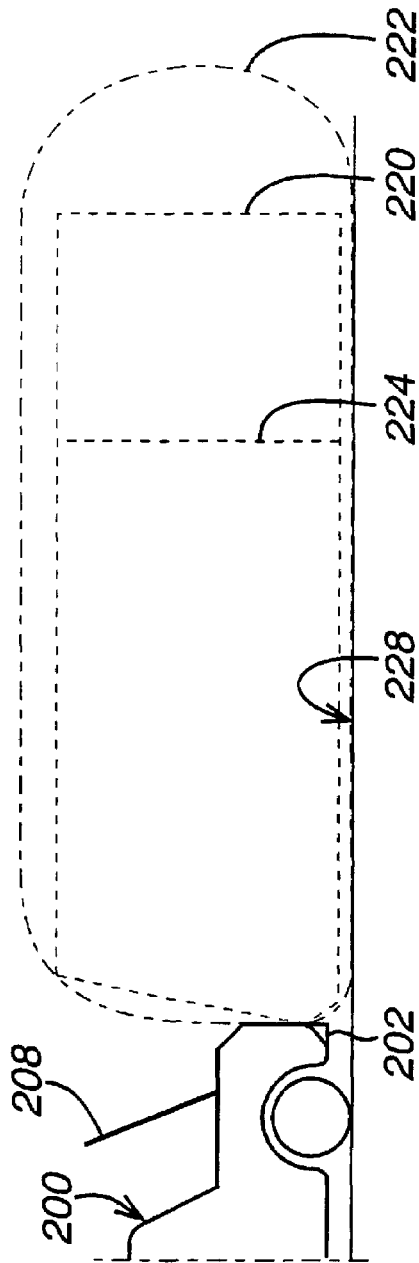
FIGS. 9 and 10 are, respectively, side and plan views of the vehicle of FIG. 8 illustrating a warning zone of the apparatus.
Figure 10:
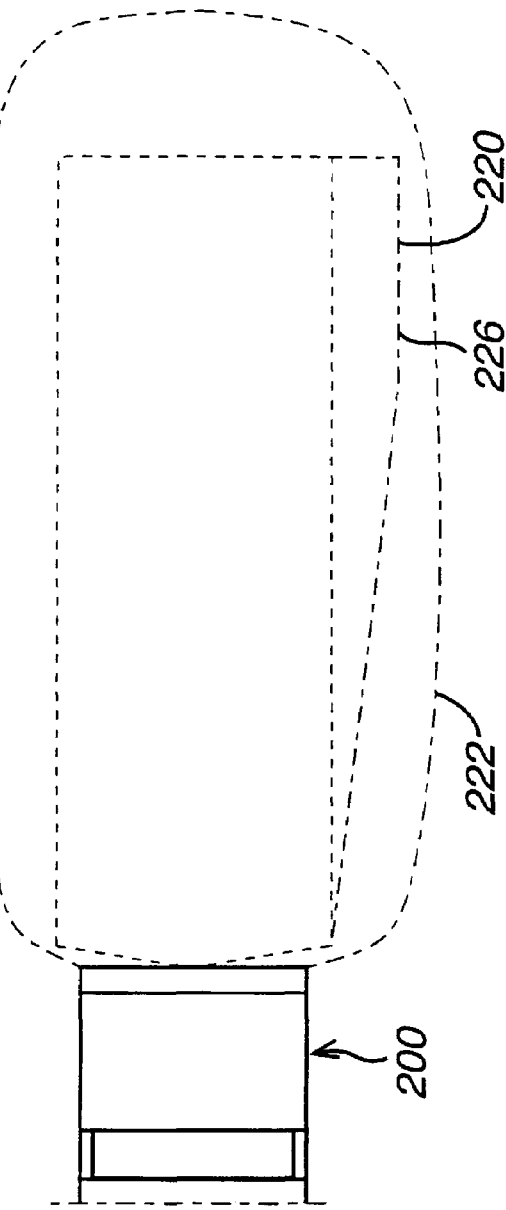

The apparatus implements a shaped warning zone, as illustrated in FIGS. 9 and 10. In this example, the warning zone might be shaped as a cuboid, as shown at 220, contained within a detection region 222 of the apparatus. A lower surface of the cuboid is spaced a short distance from the ground 228 on which the vehicle 200 is standing so that a warning is not generated by the presence of very low curbs or bumps in the road. An upper surface of the cuboid is disposed at the height of the highest part of the vehicle (for example, a radio antenna 208), plus some additional height as margin for error. Similarly, the width of the warning zone is the width of the vehicle plus a margin for error.

A Cartesian coordinate of an object within the detection field can be expressed with, for example, the X-axis across the vehicle, the Y-axis as fore and aft distance, and the Z-axis as height. Thus a cuboidal warning zone can be defined as being all points that meet the requirement that:

(Xmin<X<Xmax; Ymin<Y<Ymax; Zmin<Z<Zmax)

where Xmin, Xmax, Ymin, Ymax, Zmin, and Zmax are either constants, or are varied in response to changing operating conditions.

The apparatus may change the shape or size of the warning zone in response to changing vehicle operating conditions. The apparatus receives and processes signals from sensors mounted on the vehicle that detect, for example, the vehicle's speed, steering and throttle input, ambient conditions, and so forth. For example, at low speed, distant objects are of less concern, so the warning zone might be shortened, as shown at 224. Objects detected within the volume thus removed from the warning zone might be ignored. Alternatively, that space might be treated as a second warning zone. The apparatus may generate a low-level warning when an object is detected within the second warning zone and a higher-level warning for a closer object.

The warning zone could be defined to taper or to curve such that it is wider further from the vehicle to take into account possible variations in the vehicle's course. For example, as shown in FIG. 10, the warning zone might be extended in a direction in which the vehicle is steering. As illustrated, an additional region 226 has been introduced into the warning zone of a right-turning vehicle.

Figure 11:
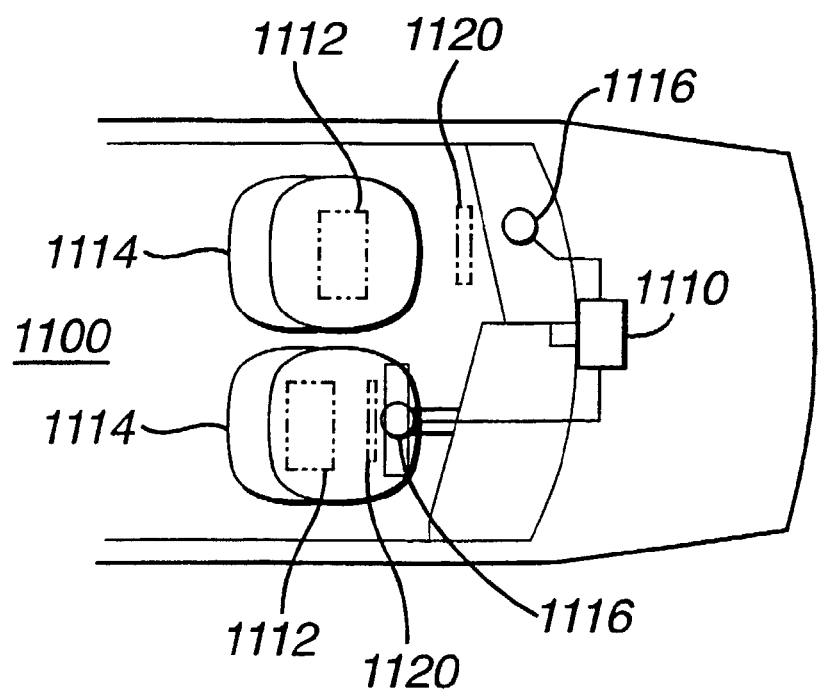
FIG. 11 shows an installation of an exemplary embodiment of the present apparatus for controlling deployment of vehicle air bags.

As another example of apparatus, with reference to FIG. 11 apparatus 1110 may be provided to monitor the internal volume 1100 of a vehicle for the purpose (for example) of intruder monitoring or control of air bags.

When such an embodiment is used as an intruder monitor, the warning zone will typically be limited to a volume that is approximately co-extensive with the interior space 1100 of a vehicle. However, (with reference to FIG. 11) when used to control air bags, the warning zone will typically include a plurality of regions 1112, each corresponding to a region that might be occupied by a passenger in a seat 1114 that is protected by an air bag 1116. Upon detection of an accident, and the requirement to deploy air bags to protect the occupants of the vehicle, the apparatus determines which regions 1112 of its warning zone are occupied, and deploy only the corresponding air bags. Additional regions 1120 of the warning zone may also be defined close to the air bags 1116. In the event that the system detects that any such additional region 1120 is occupied, deployment of the respective air bag will be suppressed to reduce the risk of injury to a person occupying that space.

Figure 12:
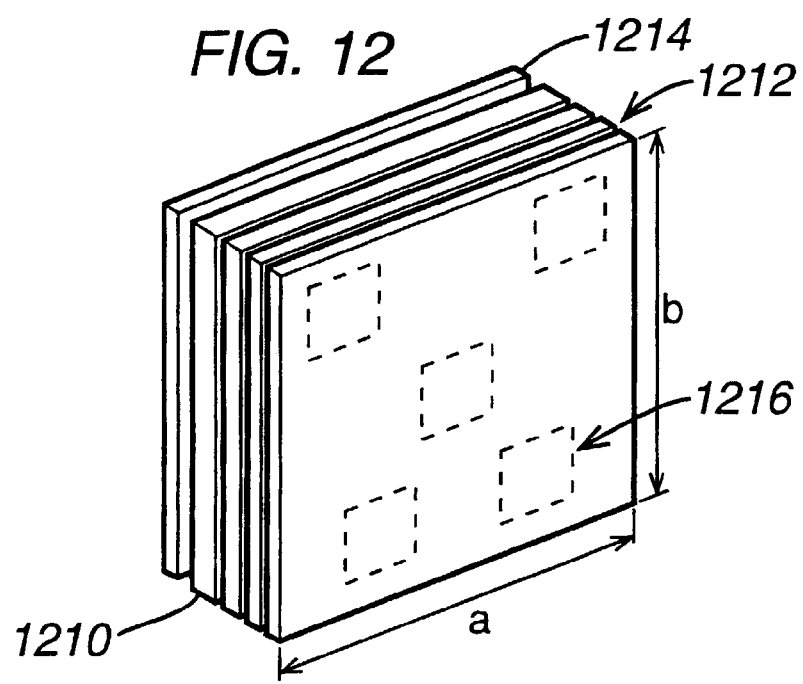
FIG. 12 shows an implementation of an exemplary embodiment of the present apparatus implemented in an integrated unit.

FIG. 12 shows one arrangement in which apparatus including an antenna array and associated processing circuitry can be arranged.

The apparatus is constructed around a metal substrate 1210, formed as a rectangular plate. On one side of the plate is mounted an antenna 1212 array comprising several polymer plates, between which is disposed a plurality of transmitting and/or receiving elements 1216. On the other side of the substrate 1210 is carried a printed circuit board 1214 upon which is constructed electronic circuits that exchange signals with the elements 1216. In this embodiment, the dimension a is approximately 12 cm and the dimension b is approximately 10 cm. The apparatus is therefore self-contained and compact.

In summary, preferred embodiments measure the position of objects and determine directly whether an intruder is present, or whether a hazard exists due to the position of the object with respect to, for example, an airbag.

Preferred embodiments consist in a fixed-aperture radar sensor for vehicles, with a wide field of view which transmits short pulses, and use a multi-element antenna, a multi-channel swept-delay sampling or mixing receiver, a cross-channel delay processor, a digitally-stored or constructed definition of an arbitrary 3-dimensional warning zone, and a digitally-stored or constructed description of the beam pattern of the antenna. Such a sensor can be used to measure the 3-dimensional position of one or more objects within its field of view, determine whether each lies within the warning zone, and determine the radar cross-section of each object.

The microwave position measuring sensor uses a small array of antennas and a wideband signal to measure the positions or shapes of objects within its field of view by a radar-like technique. The signal is emitted by one element of the array, is scattered from objects in the field of view, and a scattered portion is received a time interval later at each of the receiving elements, the interval being proportional to the distance to the object. The wide band signal (in one embodiment a short pulse) allows multiple objects to be resolved in terms of distance from the sensor. Each object gives rise to one such signal received at each element of the array, and the direction to that object is calculated by measuring and comparing the time at which the relevant signal is received at each antenna.

The advantage of this approach is that the need for precision in determining the presence of an obstacle in the warning zone is met by measuring its angular position within a relatively broad antenna beam, rather than by using a larger antenna or higher frequency to provide a precisely-tailored or narrow beam. This permits the use of a smaller frequency/aperture ratio than hitherto.

The frequency can be chosen on the basis of cost of devices (low frequency is good), size of antenna (high frequency is good), receiver performance (low frequency is good), scattering cross-section (depends on geometry, but wide relative bandwidth (high B, low F) reduces glint), and regulations.

The beam pattern of each array element is known and its description is stored within the sensor's processing electronics. A description of a 3-dimensional warning zone is also stored to determine whether an object is in a position where a warning is appropriate.

The field of view of the sensor, as determined by the antenna beam patterns, the transmitter power, the desired minimum detectable object cross-section, and the noise level, contains the warning zone and exceeds it in maximum range in most directions.

Targets may be isolated by range resolution of centimeters, and their directions found by comparing reception delays between elements of a small or minimum array. This yields a small device, adequate for any short-range applications, capable of 3D location of many range-separated static targets and of extension to synthetic or inverse synthetic aperture processing for moving targets or a moving platform.

A single fixed wideband transmitter and three, four or more fixed receiving elements form such an array. As an illustrative embodiment, the receiving array elements may be arranged at the corners of a rectangle or cuboid, with the sides of the array similar to or less in length than the wavelength, and the transmitter may be positioned near the centre of the array. The elements may be dipoles or microstrip patches, or other small radiating conductive structures, For ease of manufacture and wide bandwidth, stacked patches may be used with advantage. The array may be constructed as a single assembly of conductors printed on a glass-fibre or plastic substrate, or assembled within a dielectric radome with its associated electronics and processing computer.

In operation, these circuits are used to process the received signals, and differ from conventional antenna array processing circuits by replacing frequency shifting, or phase shifting at radio frequency, by frequency scaling. For each receiving element the output signal contains frequency components each of which is derived from its original radio frequency value by a constant divisor. The value of the divisor depends either on the rate of change of delay at which samples are obtained, or on the ratio of the target's approach speed to that of light, or both.

An array of fixed wideband, wide beam antenna elements is provided, suitable for fitting within assemblies such as car bumpers or portable enclosures, without radio frequency phase shifting or combining circuits, nor with frequency-shifting circuits or a carrier frequency local oscillator, but with a short pulse generator associated with a transmitting element and wideband, switched sampling circuits for frequency scaling associated with each receiving element.

The switched sampling receiver circuits are designed with low inter-channel timing errors to allow accurate relative timing of the received signals to be measured.

The imaging sensor also includes processing means which are operable to (a) calculate timing of, and intervals between similar signals received at each channel from objects, (b) calculate the 3D position of each object observed from such timing and offsets, (c) compare such 3D position with a stored or constructed 3D warning zone, (d) activate a warning or indication if such 3D position is inside such warning zone, (e) calculate the antenna gains in the direction of such 3D position, and (f) calculate the radar cross-section of such object from the amplitude of the signal received from it.

In addition to allowing remote detection and position measurement of obstacles, the operation of such a sensor at microwave frequencies or below allows a useful degree of penetration of solid materials. Thus the sensor may be placed behind the bumper of a car without requiring holes or special materials or treatments. It may also be positioned to detect and measure objects and obstacles behind other materials such as wood, plastic, concrete, brick and other nonmetallic materials. Metal or other objects may be detected within such nonmetallic materials. Measured objects may be stationary. Additional processing including target classification, tracking and imaging may be applied to improve the detection and measurement of moving objects.

The application of such a sensor may include automotive obstacle detection outside a vehicle; providing a driver with a complete situation assessment near the car; occupant position sensing within a vehicle; occupant identification and behaviour monitoring; collision warning for aircraft; landing aids for helicopters; fluid level measurement; security sensors for buildings; surveillance sensors for secure rooms and areas; manoeuvring aids for vehicles; earth moving equipment; traffic presence and movement; vehicle identification, etc.

An exemplary embodiment has further application to embodiments that have diverse applications. Several of these will now be described.

Since RF electromagnetic signals can penetrate building materials, exemplary embodiments that use such signals can be used to form positional images of objects behind walls and obstructions of brick, stone, concrete, cinder block, wood, plasterboard etc.

Such objects may be located in a space behind such a wall or obstruction, allowing the user to detect and measure the position or height of objects, people, animals, vehicles or surfaces in the space. This may have applications in security activities, search and rescue activities (e.g. for earthquake, landslide or avalanche victims) and many other activities in a built environment.

Such objects may also be located within the wall or obstruction itself, including reinforcing bar, studding, pipes, drains, beams and girders, and voids, cracks, gaps, ducts etc. This is useful for inspection purposes, to detect the presence and map the positions of such objects or voids etc., to facilitate works or repairs, to determine the state of the wall or obstruction, to identify the nature of such objects or voids and so forth.

Embodiments may be used to discriminate between objects exhibiting different radar cross sections, for example, pipes of different diameters or different materials, flat surfaces of different materials, etc.

Further embodiments may be used as a prosthetic for those with impaired eyesight, providing an obstacle sensor and directional warning device to warn of the approach of people, animals, obstacles, curbstones (especially given the 3-dimensional nature of positional information provided), trees, walls, and so forth. In a similar manner, exemplary embodiments may be used as a night vision aid, allowing the detection and position measurement of objects in the absence of light, in fog or smoke.

Likewise, further embodiments may be used in addition to or in place of optical or infra-red sensors in conjunction with unmanned vehicles such as robots in security applications including bomb disposal, in manufacturing, mining, warehousing and storage, tunnelling, decommissioning or construction of nuclear and other hazardous plant, demolition, building construction work, among other possibilities.

Additionally, the sensor may be used within a road vehicle to determine the position of objects which may be the head or chest of an occupant of the vehicle in relation to hazards associated with crashes and impacts, and with countermeasures such as airbags or belts. In this connection it may not be necessary to use the sensor itself with pattern matching techniques to classify the object, but merely to measure its position and motion. In this case the sensor is distinguished from prior art in that, by comparison with existing radar sensors, which measure the distance between occupant and the airbag (or other item, as the case may be) directly, and which are vulnerable to interference with the beam from objects carried, worn or inadvertently placed by the occupant, such as arms, legs, feet, hands, books, newspapers, boxes, etc. Such an embodiment can measure the angular position of the object as well as the distance and can be located in a position from which its beam is less likely to be interrupted.

It will be understood that exemplary embodiments have been described above purely by way of example, and modifications of detail can be made within the scope of the invention.

The invention claimed is:

1. Apparatus for obtaining positional information relating to an object, comprising:
   a warning zone definition stage for defining a warning zone of arbitrary shape within a detection field of the apparatus;
   an object location stage for determining the position of a detected object in the detection field, regardless of whether the object is within or outside the warning zone; and
   a discrimination stage for determining whether the detected object is within the warning zone by comparison of the determined position with the warning zone;

wherein the warning zone is defined as a three-dimensional region within the detection field, and the warning zone is contained within and is smaller than the detection field.

2. Apparatus according to claim 1, wherein the shape of the warning zone is dissimilar from the shape of the detection field.

3. Apparatus according to claim 1, wherein the warning zone definition stage is adapted to define the warning zone as a function of a coordinate within the detection field.

4. Apparatus according to claim 1, wherein the discrimination stage is adapted to determine the coordinates of the detected object and to compare the determined coordinates with the coordinates of the warning zone to determine whether the object is within the warning zone.

5. Apparatus according to claim 1, wherein the warning zone definition stage is adapted to define a plurality of non-coextensive warning zones.

6. Apparatus according to claim 5, wherein the discrimination stage is adapted to generate an output signal indicative of which of the plurality of warning zones contains the object.

7. Apparatus according to claim 6, wherein the discrimination stage is adapted to apply different logic to at least two of the zones.

8. Apparatus according to claim 1, wherein the warning zone is at least one of non-circular and non-spherical and approximately cuboid.

9. Apparatus according to claim 1, wherein the discrimination stage is adapted to analyze a characteristic of an object outside of the warning zone.

10. Apparatus according to claim 9, wherein the discrimination stage is operable to track an object outside the warning zone and to predict its entry into the warning zone.

11. Apparatus according to claim 10, wherein the apparatus is operable to issue a pre-warning based on the prediction.

12. Apparatus according to claim 1, wherein the warning zone definition stage is adapted to determine the shape and a relevant dimension of the warning zone at least in part in dependence on a corresponding shape and dimension of a vehicle associated with the apparatus.

13. Apparatus according to claim 1, wherein the warning zone definition stage is adapted to define the warning zone to have a lower surface that is substantially planar and spaced above a road surface upon which a vehicle associated with the apparatus is located.

14. Apparatus according to claim 1, wherein the warning zone definition stage is adapted to determine the shape and a relevant dimension of the warning zone in dependence on operating conditions of a vehicle associated with the apparatus.

15. Apparatus according to claim 14, wherein the vehicle operating conditions include at least one of speed, direction of travel, and ambient environmental conditions.

16. Apparatus according to claim 1, wherein the warning zone definition stage is adapted to define a warning zone within a passenger compartment of a vehicle associated with the apparatus.

17. Apparatus according to claim 16, wherein the apparatus is operable to determine the number and position of the occupants of the vehicle.

18. Apparatus according to claim 16, wherein the apparatus is operable, in dependence on whether the object is within the warning zone, to at least one of control deployment of an air bag and detect an intruder and detect movement of a driver of the vehicle.

19. Apparatus according to claim 1, wherein the discrimination stage is operative to generate an output signal indicative that the object is within the warning zone.

20. Apparatus according to claim 1, operable to issue a warning to a user upon detection of an object in the warning zone, wherein said warning is at least one of an audible warning and a visual warning and a tactile warning.

21. Apparatus according to claim 1, wherein the object location stage comprises:
a transmitter for transmitting a probe signal towards the object, the transmitter comprising a transmitting element;
a receiver for receiving the probe signal as returned by the object, the receiver comprising at least one receiving element; and
a processor for processor for processing the received probe signal.

22. Apparatus according to claim 21, wherein the processor is operable to determine a radar cross section of the object and to compare the radar cross section with a threshold value of radar cross section.

23. Apparatus according to claim 21, wherein the processor is operable to compare the received probe signal with a signal threshold.

24. Apparatus according to claim 21, wherein the processor is operable to at least one of determine the evolution of angular position of the object, and predict the path of movement of the object.

25. Apparatus according to claim 21, wherein the processor is operable to compare the received signal with a pattern corresponding to signals received from a known class of objects.

26. Apparatus according to claim 21, wherein the probe signal comprises electromagnetic radiation.

27. Apparatus according to claim 21, wherein the at least one receiving element forms an antenna array which is adapted to be located on a fixed location on a vehicle.

28. Apparatus according to claim 21, wherein the at least one receiving element forms an antenna array which is adapted to be located within a component of a vehicle, such as a non-metallic component.

29. Apparatus according to claim 21, wherein the at least one receiving element forms an antenna array which is adapted to be located within a non-metallic component of a vehicle.

30. Apparatus according to claim 21, wherein the at least one receiving element forms an antenna array which is adapted to be located within a bumper of a vehicle.

31. Apparatus according to claim 21, wherein the at least one receiving element forms an antenna array which is adapted to be located within a nonmetallic bumper of a vehicle.

32. Apparatus according to claim 1, further comprising a display adapted to present a visual representation of a detection field and an object within the detection field.

33. Apparatus according to claim 1, comprising:
a transmitter for transmitting a probe signal towards the object, the transmitter comprising a transmitting element;
a receiver for receiving, at a plurality of spaced apart locations, the probe signal as returned by the object, the receiver comprising a plurality of receiving elements forming an antenna array;
a detector, coupled to the receiver, for detecting the relative timing of the returned probe signals as received at the plurality of spaced apart locations;

whereby angular position information for the object can be determined from the relative timing.

34. Apparatus according to claim 33, wherein the transmitting element and receiving elements are disposed on a common substrate.

35. Apparatus according to claim 34, wherein the receiving elements are arranged such that there is a first pair of the receiving elements and a second pair of the receiving elements, the spacing of the elements in the first pair and in the second pair being unequal and the first and second pairs having dissimilar artifacts in their sensitivity patterns, and the positional information for the object can be determined from the relative timing of the returned probe signals as received at the first pair of the receiving elements, and from the relative timing of the returned probe signals as received at the second pair of the receiving elements.

36. Apparatus according to claim 33, adapted to be contained within a single housing.

37. Apparatus according to claim 33, wherein the receiving elements are spaced apart by distances that are the same order of magnitude as the wavelength λ of the radiation that the apparatus is intended to transmit and receive.

38. Apparatus according to claim 33, further comprising:
a processor,
wherein the processor and the antenna array are constructed as a single assembly.

39. Apparatus according to claim 33, wherein the receiver comprises at least three receiving elements arranged non-collinearly and such that there is no axis about which the array is symmetrical.

40. Apparatus according to claim 33, wherein the receiving elements are arranged substantially at the vertices of a trapezial locus having long and short parallel sides, the length of the shorter side being approximately the wavelength λ of the radiation that the array is intended to transmit and receive, and the length of the longer side is approximately $3\lambda/2$.

41. Apparatus according to claim 33, wherein the receiving elements are arranged substantially at the vertices of a trapezial locus having long and short parallel sides, the short side being between 0.5 and 1.0 times the length of the long side.

42. Apparatus according to claim 33, wherein the frequency of the transmitted signal is within one of the range 0.5 to 77 GHz, the range 2 to 25 GHz, and the range 2 to 2.5 GHz.

43. Apparatus according to claim 42, wherein the frequency of the transmitted signal is one of approximately 0.5 GHz, 1 GHz, 6 GHz, 10 Ghz, and 2.45 GHz.

44. Apparatus according to claim 33, further comprising a processor operable to compare the signals derived from two of the receiving elements and to determine the time difference at which the signals appear most similar.

45. Apparatus according to claim 33, further comprising:
a processor operable to apply a cross-correlation process to the returned probe signals.

46. Apparatus according to claim 45, wherein the cross-correlation process is a truncated cross-correlation process.

47. Apparatus according to claim 1, being operative in an operating cycle for each of m steps in which n=1, 2 . . . m, and including:
a signal generating stage operative, simultaneously with or at a fixed time after a transmitting trigger instant $t_n$ to generate a signal, and a transmitting element to transmit the signal into the detection field;
a plurality of spaced receiving elements operative simultaneously with or at a fixed time after a receiving trigger instant $r_n$ to receive a portion of the signal reflected from one or more objects in the detection field, the interval $r_n - t_n$ varying as a function of n and having a magnitude in a range corresponding to the times of travel of a signal reflected from an object within the detection field;
a processor for identifying the values of n at which signals reflected from one object are received at two or more receiving elements and thereby detecting the time taken, and therefore the distance traveled, by the signals from the transmitting element to the various receiving elements;
wherein the processor is operable to calculate the position of the object from the various path lengths thereby identified.

48. Apparatus according to claim 47, wherein the range of variation of $r_n - t_n$ covers a range of time within which it is expected that a signal reflected from an object will be received if the object is somewhere in the detection field.

49. Apparatus according to claim 1, wherein the objection location stage is adapted to use a moving range gate in determining the position of the object.

50. Apparatus according to claim 49, wherein the moving range gate scans the detection field of the apparatus.

51. Apparatus according to claim 1, wherein the positional information comprises at least one of the range, azimuth and elevation of the object.

52. Apparatus according to claim 1 for use in a vehicle.

53. Apparatus according to claim 1, further comprising a processor for obtaining information about objects within or behind a wall.

54. Apparatus according to claim 1, further comprising a display for providing an image of an environment in conditions that human vision is compromised.

55. Apparatus according to claim 54, operable when vision is compromised by at least one of the physiological condition of a user and environmental conditions.

56. A vehicle comprising apparatus according to claim 1.

57. A hand-held tool comprising apparatus according to claim 1.

58. Apparatus for obtaining positional information relating to an object, comprising:
a warning zone definition stage for defining a warning zone of arbitrary shape within a detection field of the apparatus;
a transmitter for transmitting a probe signal towards an object, the transmitter comprising a transmitting element;
a receiver for receiving, at a plurality of spaced apart locations, the probe signal as returned by the object, the receiver comprising a plurality of receiving elements forming an antenna array;
a detector, coupled to the receiver, for detecting the relative timing of the returned probe signals as received at the plurality of spaced apart locations, thereby to determine the position of the object in the detection field, regardless of whether the object is within or outside the warning zone located within the detection field; and
a discrimination stage for determining whether the object is within the warning zone by comparison of the determined position with the warning zone;
wherein the warning zone is defined as a three-dimensional region within the detection field, and the warning zone is contained within and is smaller than the detection field.

59. Apparatus for obtaining positional information relating to an object, the apparatus being adapted to be located on a vehicle and comprising:
- a warning zone definition stage for defining a warning zone of arbitrary shape within a detection field of the apparatus;
- an object location stage for determining the position of a detected object in the detection field of the apparatus, regardless of whether the object is within or outside the warning zone; and
- a discrimination stage for determining whether the detected object is within the warning zone by comparison of the determined position with the warning zone;
- wherein the object location stage is located in a single housing or on a common substrate, the single housing or common substrate being adapted to be located within a bumper of the vehicle; and
- the warning zone definition stage is operable to define the warning zone as a three-dimensional region within the detection field, contained within and smaller than the detection field, and at least partially surrounding the vehicle when the apparatus is located on the vehicle.

60. Apparatus for obtaining positional information relating to an object, comprising:
- a warning zone definition stage for defining a warning zone of arbitrary shape within a detection field of the apparatus;
- an object location stage for determining the position of a detected object in the detection field, regardless of whether the object is within or outside the warning zone; and
- a discrimination stage for determining whether the detected object is within or outside the warning zone by comparison of the determined position with the warning zone;
- wherein the warning zone is a three-dimensional region within and smaller than the detection field, and is within a passenger compartment of the vehicle; and
- the apparatus is operable, in dependence on whether the object is within the warning zone, to at least one of control deployment of an air bag and detect an intruder and detect movement of a driver of the vehicle.

61. A method for obtaining positional information relating to an object, comprising:
- defining a warning zone of arbitrary shape within a detection field of the apparatus;
- determining the position of a detected object in the detection field, regardless of whether the object is within or outside the warning zone; and
- determining whether the detected object is within the warning zone by comparison of the determined position with the warning zone;
- wherein the warning zone is defined as a three-dimensional region within the detection field, and the warning zone is contained within and is smaller than the detection field.

62. A storage device storing processor-executable instructions for performing the method of claim 61.

* * * * *